(12) United States Patent
Sugita et al.

(10) Patent No.: US 11,385,753 B2
(45) Date of Patent: Jul. 12, 2022

(54) TOUCH PANEL DEVICE

(71) Applicant: SHARP KABUSHIKI KAISHA, Sakai (JP)

(72) Inventors: Yasuhiro Sugita, Sakai (JP); Kazutoshi Kida, Sakai (JP); Hiroshi Fukushima, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/367,527

(22) Filed: Jul. 5, 2021

(65) Prior Publication Data

US 2022/0019316 A1 Jan. 20, 2022

(30) Foreign Application Priority Data

Jul. 16, 2020 (JP) .............................. JP2020-122047

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ... G06F 3/0446; G06F 3/0412; G06F 3/04164
See application file for complete search history.

(56) References Cited

U.S. PATENT DOCUMENTS

| | | | |
|---|---|---|---|
| 2008/0049487 A1* | 2/2008 | Yoshimura | H01L 27/2436 365/189.011 |
| 2008/0158461 A1* | 7/2008 | Kenmochi | G02F 1/13624 349/48 |
| 2008/0224971 A1* | 9/2008 | Utsunomiya | G06F 3/0446 345/87 |
| 2010/0253651 A1* | 10/2010 | Day | G06F 3/0443 345/175 |
| 2015/0179122 A1* | 6/2015 | Brown | G06F 3/0443 345/174 |
| 2016/0091919 A1* | 3/2016 | Takeda | G06F 3/038 345/174 |
| 2016/0098124 A1* | 4/2016 | Takeda | G06F 3/0446 345/174 |
| 2016/0117019 A1* | 4/2016 | Takeda | G06F 3/03 345/174 |
| 2017/0102826 A1* | 4/2017 | Hamaguchi | G06F 3/03545 |
| 2017/0103247 A1* | 4/2017 | Mizuhashi | H05K 1/0274 |
| 2017/0123568 A1* | 5/2017 | Takeda | G06F 3/04162 |
| 2017/0160863 A1* | 6/2017 | Suzuki | G06F 3/0443 |
| 2017/0277931 A1* | 9/2017 | Uehara | G02F 1/13338 |

(Continued)

FOREIGN PATENT DOCUMENTS

JP 2016-540317 A 12/2016

*Primary Examiner* — Amy Onyekaba
(74) *Attorney, Agent, or Firm* — ScienBiziP, P.C.

(57) ABSTRACT

A switching unit of a touch panel device switches between a first connection state in which, among a plurality of drive wiring lines, a first drive wiring line and a second drive wiring line adjacent to each other are connected, and a second connection state in which, among the plurality of drive wiring lines, the first drive wiring lines adjacent to each other are connected to each other and the second drive wiring lines adjacent to each other are connected to each other.

11 Claims, 13 Drawing Sheets

(56) References Cited

U.S. PATENT DOCUMENTS

2018/0203540 A1\* 7/2018 Maguire ............... G06F 3/0448
2018/0292698 A1\* 10/2018 Koide .................... G06F 3/044
2020/0225789 A1\* 7/2020 Akimoto ............ G06V 40/1306

\* cited by examiner

TOUCH PANEL DEVICE

CROSS-REFERENCE TO RELATED APPLICATIONS

This application claims the benefit of priority to Japanese Patent Application Number 2020-122047 filed on Jul. 16, 2020. The entire contents of the above-identified application are hereby incorporated by reference.

BACKGROUND

Technical Field

One aspect of the present disclosure relates to a touch panel device.

JP 2016-540317 T discloses a touch panel capable of detecting a position of an input object that is a non-conductor, based on a change in an electrostatic capacitance between electrodes.

SUMMARY

There is a need for a touch panel device capable of accurately detecting not only a position of an input object of a non-conductor but also a position of an input object of a conductor such as a touch pen. An object of an aspect of the present disclosure is to provide a touch panel device capable of accurately detecting touch positions of an input object that is a conductor and an input object that is a non-conductor.

A touch panel device according to a first aspect of the present disclosure includes a plurality of drive wiring lines extending in a column direction, each of the plurality of drive wiring lines configured to cause a drive signal to flow, a plurality of detection wiring lines extending in a row direction intersecting the plurality of drive wiring lines, each of the plurality of detection wiring lines configured to cause a detection signal to flow, the detection signal indicating a change in a capacitance formed based on the corresponding drive wiring line among the plurality of drive wiring lines, a plurality of drive electrodes individually connected to the corresponding drive wiring line among the plurality of drive wiring lines, a plurality of detection electrodes individually connected to the corresponding detection wiring line among the plurality of detection wiring lines, and a switching unit configured to switch a connection state of each two of the plurality of drive wiring lines, wherein the plurality of drive wiring lines include a plurality of first drive wiring lines and a second drive wiring lines alternately arranged, the plurality of drive electrodes are alternately connected to the plurality first drive wiring lines and the plurality of second drive wiring line adjacent to each other for every first predetermined constant number of the drive electrodes along a column direction, and the switching unit is configured to switch between a first connection state where the first drive wiring line and the second drive wiring line that are adjacent to each other among the plurality of drive wiring lines are connected, and a second connection state where the first drive wiring lines adjacent to each other are connected to each other and the second drive wiring lines adjacent to each other are connected to each other.

BRIEF DESCRIPTION OF DRAWINGS

The disclosure will be described with reference to the accompanying drawings, wherein like numbers reference like elements.

DESCRIPTION OF EMBODIMENTS

Embodiment

Figure 1:
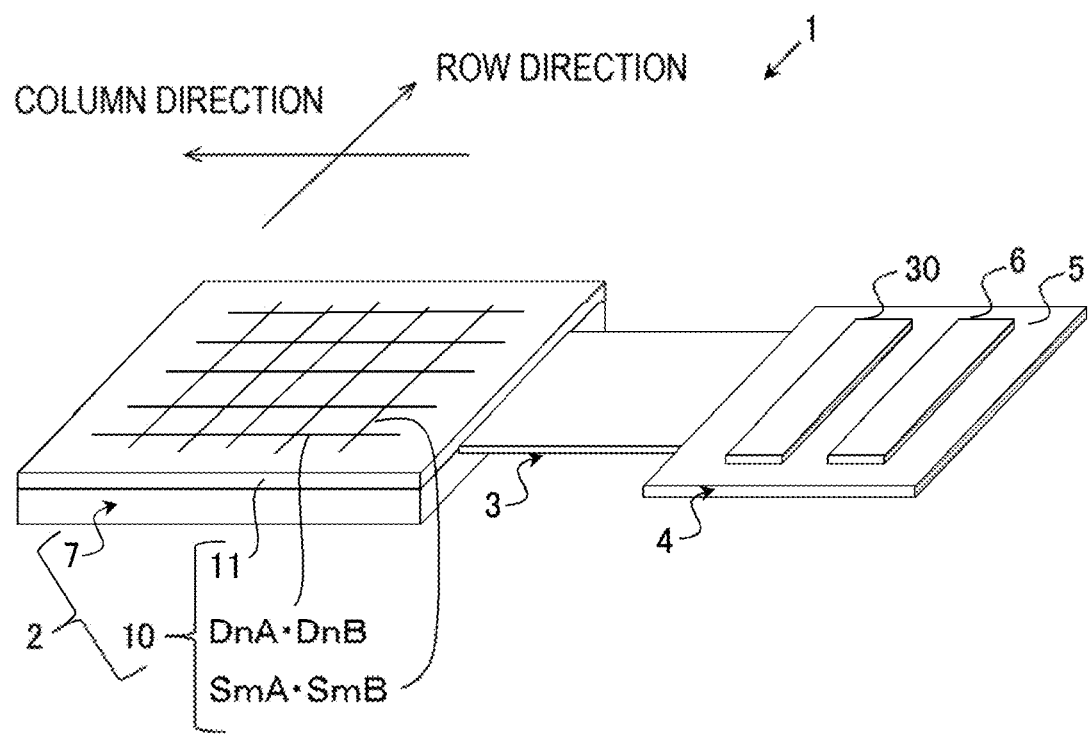
FIG. 1 is a perspective view of a display device including a touch panel device according to an embodiment.

FIG. 1 is a perspective view illustrating a configuration of a touch panel device 1 according to an embodiment. As illustrated in FIG. 1, the touch panel device 1 includes, for example, a touch panel portion 2, a flexible printed circuit (FPC) 3, and a control board 4. The touch panel portion 2 includes a display panel 7 and a touch sensor portion 10. The touch sensor portion 10 includes a touch sensor substrate 11, a plurality of drive wiring lines DnA and DnB, and a plurality of detection wiring lines SmA and SmB. Note that each of n and m is a natural number equal to or larger than 1. The control board 4 includes a circuit substrate 5, and a controller unit 6 and a switching unit 30 that are mounted on the circuit substrate 5.

Note that, in the present embodiment, the touch panel portion 2 having a so-called out-cell type structure in which the touch sensor portion 10 is provided on an outer surface of the display panel 7 will be described as an example, but the touch sensor portion 10 may have a so-called in-cell type structure provided inside the display panel 7. Additionally, the touch panel portion 2 may have a so-called on-cell type structure in which the touch sensor portion 10 is provided directly on the display panel 7.

It is sufficient that the display panel 7 be a panel capable of displaying an image, and for example, various display panels such as a liquid crystal display panel, and an organic Electro-Luminescence (EL) display panel may be employed.

The touch sensor portion 10 is a sensor that detects a touch position (coordinate position) on a surface of the touch panel portion 2 of an input object in contact with or in proximity to (hereinafter simply referred to as contact, touch, or the like) the surface (touch surface) of the touch panel portion 2, for example, by an electrostatic capacitance type. The touch sensor portion 10 can detect the touch position even when the input object is a conductor or a non-conductor. Note that examples of the input object that is a conductor can include a finger or a touch pen whose pen tip is a conductor. Additionally, examples of the input object that is a non-conductor can include a glove, an eraser, or the like.

The touch sensor substrate 11 is provided to overlap a display region of the display panel 7, and is constituted by a transparent insulating material such as glass or resin, for example. The plurality of drive wiring lines DnA and DnB and the plurality of detection wiring lines SmA and SmB are formed on a surface of the touch sensor substrate 11 so as to intersect each other. Each of the plurality of drive wiring lines DnA and DnB extends in a column direction, for example, and is a wiring line configured to cause a drive signal which the controller unit 6 uses in order to detect a touch position to flow. Each of the plurality of detection wiring lines SmA and SmB extends in a row direction intersecting the column direction, for example. Each of the plurality of detection wiring lines SmA and SmB is a wiring line configured to cause a detection signal indicating a change in a capacitance formed based on the corresponding plurality of drive wiring lines DnA and DnB to flow, and causes the detection signal to flow to the controller unit 6.

Note that the row direction is a direction from the front side toward the back side in FIG. 1. Additionally, in FIG. 1, the column direction is a direction from the right side toward the left side (a direction away from the switching unit 30) with respect to the page.

Furthermore, a drive electrode and a detection electrode (that will be described below) for detecting a touch position of an input object are provided in a region surrounded by each of the plurality of drive wiring lines DnA and DnB and each of the plurality of detection wiring lines SmA and SmB.

The flexible printed circuit 3 is provided with the plurality of drive wiring lines DnA and DnB and the plurality of detection wiring lines SmA and SmB drawn from the touch sensor portion 10. Furthermore, each of the plurality of drive wiring lines DnA and DnB and each of the plurality of detection wiring lines SmA and SmB drawn to the flexible printed circuit 3 are connected to the switching unit 30, and are connected to the controller unit 6 via the switching unit 30.

The control board 4 controls driving of the touch sensor portion 10, and acquires input information indicating a touch position from the touch sensor portion 10. The switching unit 30 includes a plurality of switches (that will be described below) configured to switch connection states of each of the plurality of drive wiring lines DnA and DnB and the plurality of detection wiring lines SmA and SmB. When the switching unit 30 receives a switching instruction signal indicating switching between a first connection state and a second connection state from the controller unit 6, the switching unit 30 drives each switch, and switches the electrical connection state of each of the plurality of drive wiring lines DnA and DnB and the plurality of detection wiring lines SmA and SmB.

The first connection state is a connection state for detecting a touch position of an input object that is a conductor by the touch sensor portion 10. The second connection state is a connection state for detecting a touch position of an input object that is a conductor, and a touch position of an input object that is a non-conductor by the touch sensor portion 10.

Specifically, as will be described in detail below, the first connection state is a connection state in which a pitch between the drive electrode and the detection electrode for detecting a touch position is made fine, and is a connection state for detecting only a touch position of an input object that is a conductor out of a conductor and a non-conductor, with higher definition than that in a case of the second connection state. On the other hand, the second connection state is a connection state in which a pitch between the drive electrode and the detection electrode for detecting a touch position is made wider than that in a case of the first connection state, and is a connection state in which the touch position can be detected even when an input object is a conductor or a non-conductor. The second connection state is also a connection state in which the touch panel device 1 determines whether the input object is a conductor or a non-conductor.

Additionally, in the case of the second connection state, the controller unit 6 determines whether the input object that has touched on the touch sensor portion 10 is a conductor or a non-conductor. Note that in the case of the second connection state, when the controller unit 6 determines that the input object that has touched on the touch sensor portion 10 is a conductor, the controller unit 6 may switch the connection state of the switching unit 30 from the second connection state to the first connection state. Alternatively, in the case of the first connection state, the controller unit 6 does not need to determine whether the input object that has touched on the touch sensor portion 10 is a conductor or a non-conductor.

The controller unit 6 inputs a drive signal to each of the plurality of drive wiring lines DnA and DnB via the switching unit 30, and acquires, from each of the plurality of detection wiring lines SmA and SmB, a detection signal indicating a change in a capacitance formed based on each drive wiring line. The controller unit 6 detects, by calculation, a touch position of an input object in proximity to the plurality of drive electrodes and the plurality of detection electrodes provided in the touch sensor portion 10 based on the detection signal output from each of the plurality of detection wiring lines SmA and SmB. Further, the controller unit 6 outputs, to the switching unit 30, a switching instruction signal indicating switching between the first connection state and the second connection state.

Figure 2:
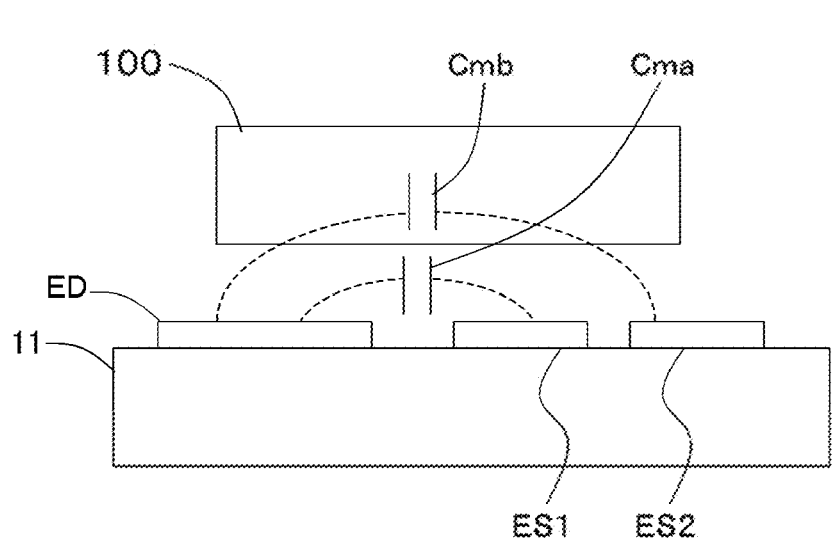
FIG. 2 is a schematic diagram illustrating a state in which an input object is close to a surface of a touch sensor portion according to the embodiment.

Next, a principle of an operation in which the touch sensor portion 10 detects a touch position of an input object that is a conductor or a non-conductor when the switching unit 30 is in the second connection state will be described by using FIG. 2 to FIG. 6. FIG. 2 is a schematic diagram illustrating a state of an input object 100 brought close to a surface of the touch sensor portion 10. FIG. 2 illustrates a schematic cross-sectional view of the touch sensor portion 10. A plurality of drive electrodes ED and a plurality of detection electrodes ES1 and ES2 are provided in a matrix on the touch sensor substrate 11. The detection electrode ES1, of the detection electrode ES1 and the detection electrode ES2, is a short distance detection electrode that is close in distance to the drive electrode ED being a target. The detection electrode ES2 is a long distance detection electrode that is far in distance from the drive electrode ED being a target. The drive electrode ED is connected to the drive wiring line DnA or the drive wiring line DnB, and a drive signal is supplied from the drive wiring line DnA or the drive wiring line DnB. The detection electrode ES1 and the detection electrode ES2 are connected to the detection wiring line SmA or the detection wiring line SmB, and supply detection signals to the detection wiring line SmA or the detection wiring line SmB.

When the input object 100 that is a conductor or a non-conductor approaches the drive electrode ED and the detection electrodes ES1 and ES2, a short distance capacitance Cma formed between the drive electrode ED and the detection electrode ES1 changes, and a long distance capacitance Cmb formed between the drive electrode ED and the detection electrode ES2 changes.

Figure 3:
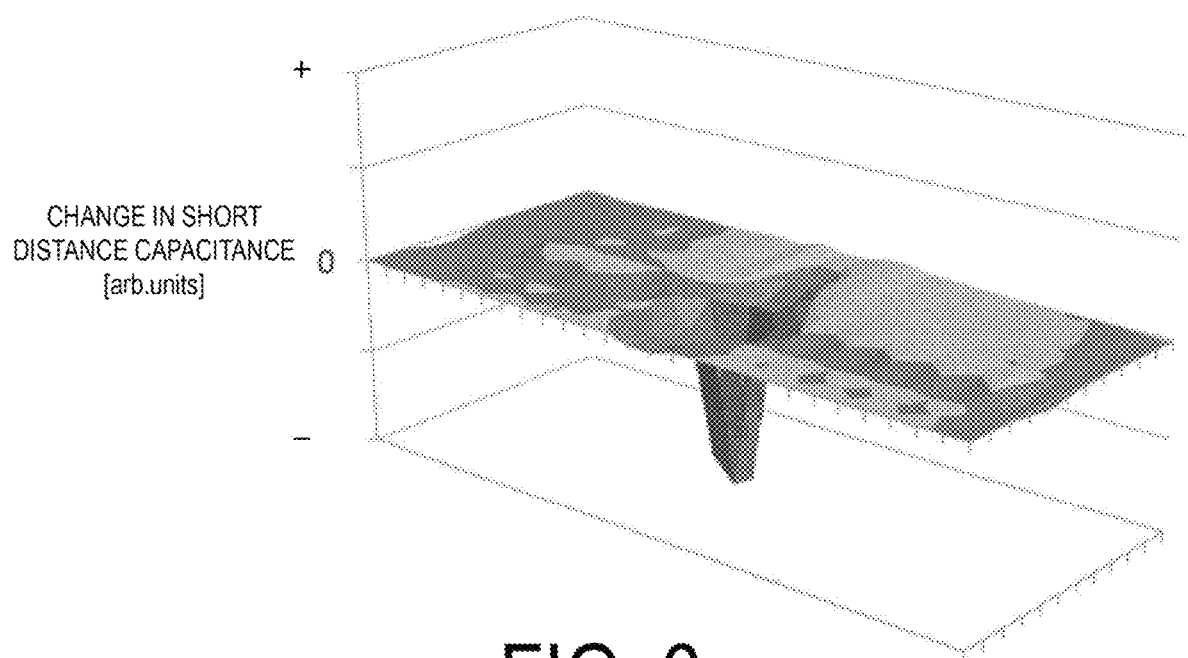
FIG. 3 is a diagram illustrating a change in a short distance capacitance when an input object that is a conductor is brought close to a drive electrode and a detection electrode, according to the embodiment.
Figure 4:
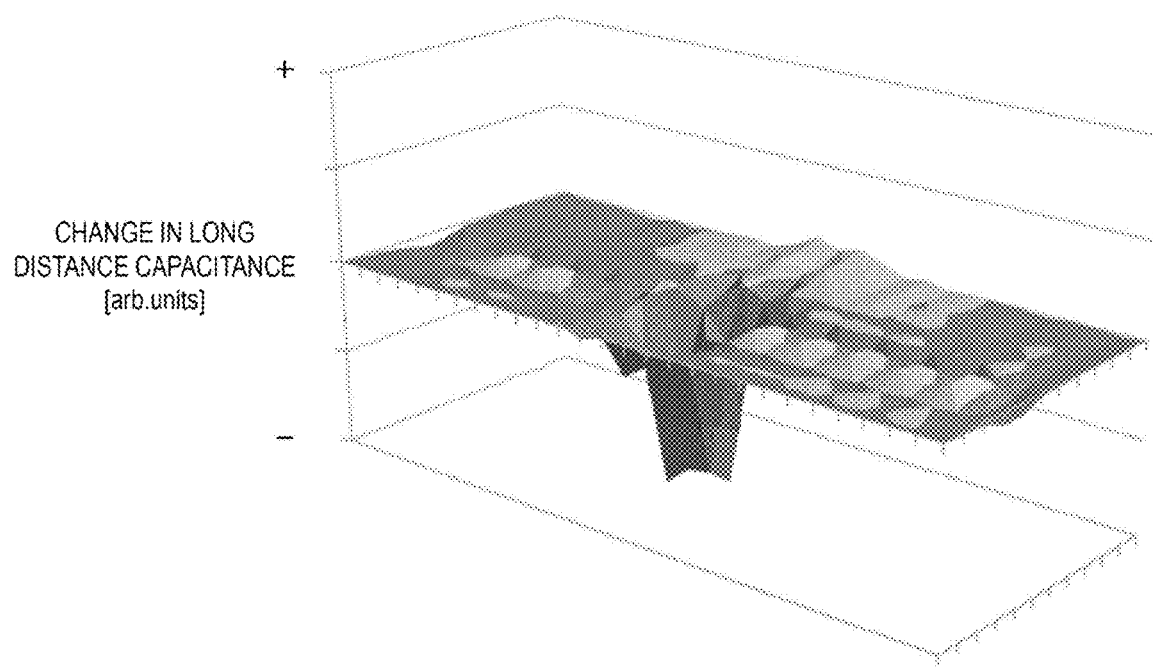
FIG. 4 is a diagram illustrating a change in a long distance capacitance when an input object that is a conductor is brought close to the drive electrode and the detection electrode, according to the embodiment.

FIG. 3 is a diagram illustrating a change in a short distance capacitance Cma when the input object 100 that is a conductor is brought close to the drive electrode ED and the detection electrodes ES1 and ES2, according to the embodiment. FIG. 4 is a diagram illustrating a change in a long distance capacitance Cmb when the input object 100 that is a conductor is brought close to the drive electrode ED and the detection electrodes ES1 and ES2, according to the embodiment. In other words, FIG. 3 illustrates a change in the capacitance of the detection electrode ES1 when the input object 100 that is a conductor is brought close to the drive electrode ED and the detection electrodes ES1 and ES2. FIG. 4 also illustrates a change in the capacitance of the detection electrode ES2 when the input object 100 that is a conductor is brought close to the drive electrode ED and the detection electrodes ES1 and ES2. The horizontal axes in FIG. 3 and FIG. 4 are coordinate positions on the surface of the touch panel portion 2.

As illustrated in FIG. 3 and FIG. 4, in the case where the input object 100 is a conductor, both the short distance capacitance Cma and the long distance capacitance Cmb change in a decreasing direction. Thus, for example, the controller unit (position calculation unit) 6 can determine that the input object 100 whose touch position is detected by the touch sensor portion 10 is a conductor.

Figure 5:
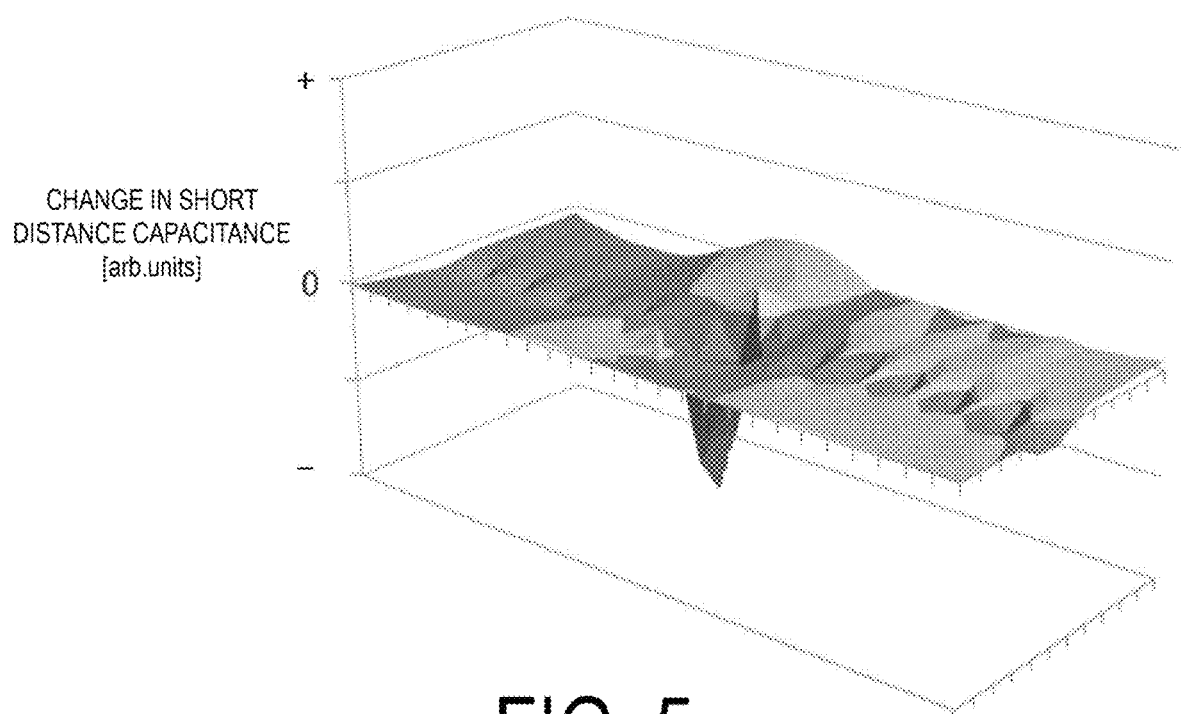
FIG. 5 is a diagram illustrating a change in a short distance capacitance when an input object that is a non-conductor is brought close to the drive electrode and the detection electrode, according to the embodiment.
Figure 6:
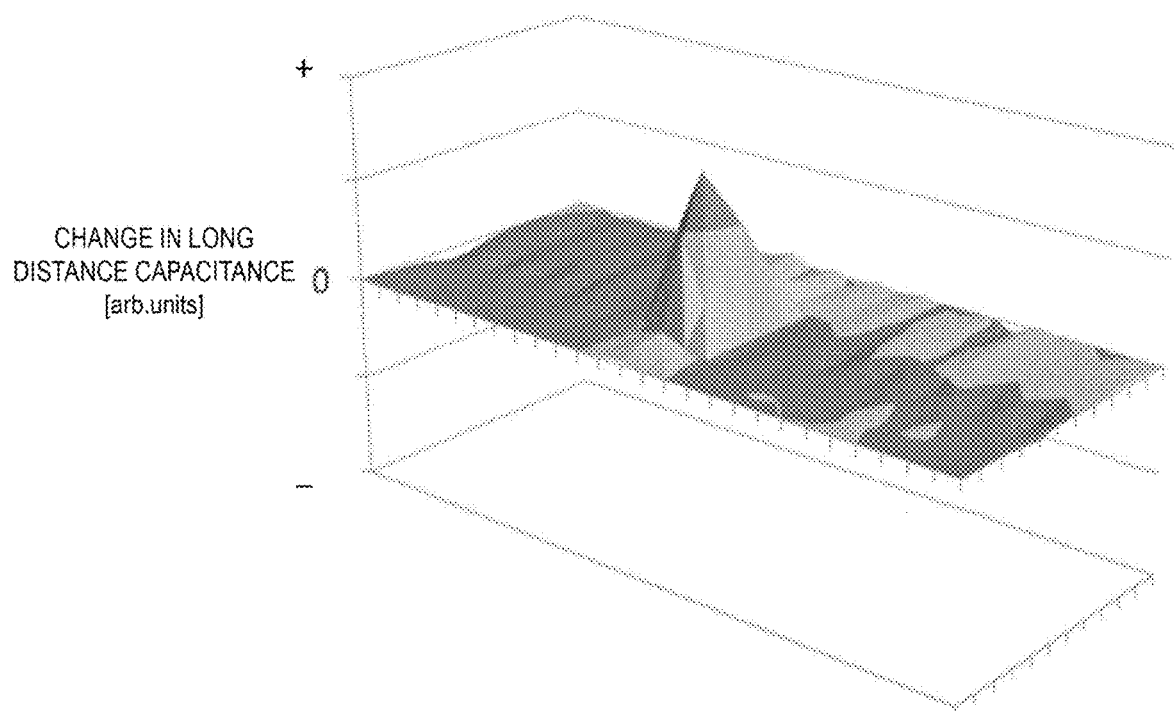
FIG. 6 is a diagram illustrating a change in a long distance capacitance when an input object that is a non-conductor is brought close to the drive electrode and the detection electrode, according to the embodiment.

FIG. 5 is a diagram illustrating a change in the short distance capacitance Cma when the input object 100 that is a non-conductor is brought close to the drive electrode ED and the detection electrodes ES1 and ES2, according to the embodiment. FIG. 6 is a diagram illustrating a change in the long distance capacitance Cmb when the input object 100 that is a non-conductor is brought close to the drive electrode ED and the detection electrodes ES1 and ES2, according to the embodiment. In other words, FIG. 5 illustrates a change in the capacitance of the detection electrode ES1 when the input object 100 that is a non-conductor is brought close to the drive electrode ED and the detection electrodes ES1 and ES2. FIG. 6 also illustrates a change in the capacitance of the detection electrode ES2 when the input object 100 that is a non-conductor is brought close to the drive electrode ED and the detection electrodes ES1 and ES2. The horizontal axes in FIG. 5 and FIG. 6 are coordinate positions on the surface of the touch panel portion 2.

As illustrated in FIG. 5 and FIG. 6, when the input object 100 is a non-conductor, the short distance capacitance Cma changes in the decreasing direction, while the long distance capacitance Cmb changes in the increasing direction. Thus, for example, the controller unit 6 can determine that the input object 100 whose touch position is detected by the touch sensor portion 10 is a non-conductor.

For example, when the controller unit 6 determines that the input object 100 is a conductor, the controller unit 6 outputs a switching instruction signal by which the connection state is switched to the first connection state to the switching unit 30 to switch the switching unit 30 to be in the first connection state. Further, for example, when the controller unit 6 determines that the input object 100 is a non-conductor, the controller unit 6 outputs a switching instruction signal by which the connection state is switched to the second connection state to the switching unit 30 to switch the switching unit 30 to be in the second connection state. Note that the controller unit 6 may switch the switching unit 30 to the first connection state, and may switch the switching unit 30 to the second connection state, based on an instruction signal input from a user.

Further, the controller unit 6 can detect the proximity of the distance (a short distance, a medium distance, a long distance, and the like) of the drive electrode ED and the detection electrodes ES1 and ES2 with respect to the input object that is a non-conductor, depending on directions in which the capacitance Cma and the capacitance Cmb change (in the increasing direction or decreasing direction) and change amounts thereof.

Next, with reference to FIG. 7 and FIG. 8, the specific arrangement of the drive electrodes and the detection electrodes in the touch panel portion 2 will be described.

Figure 7:
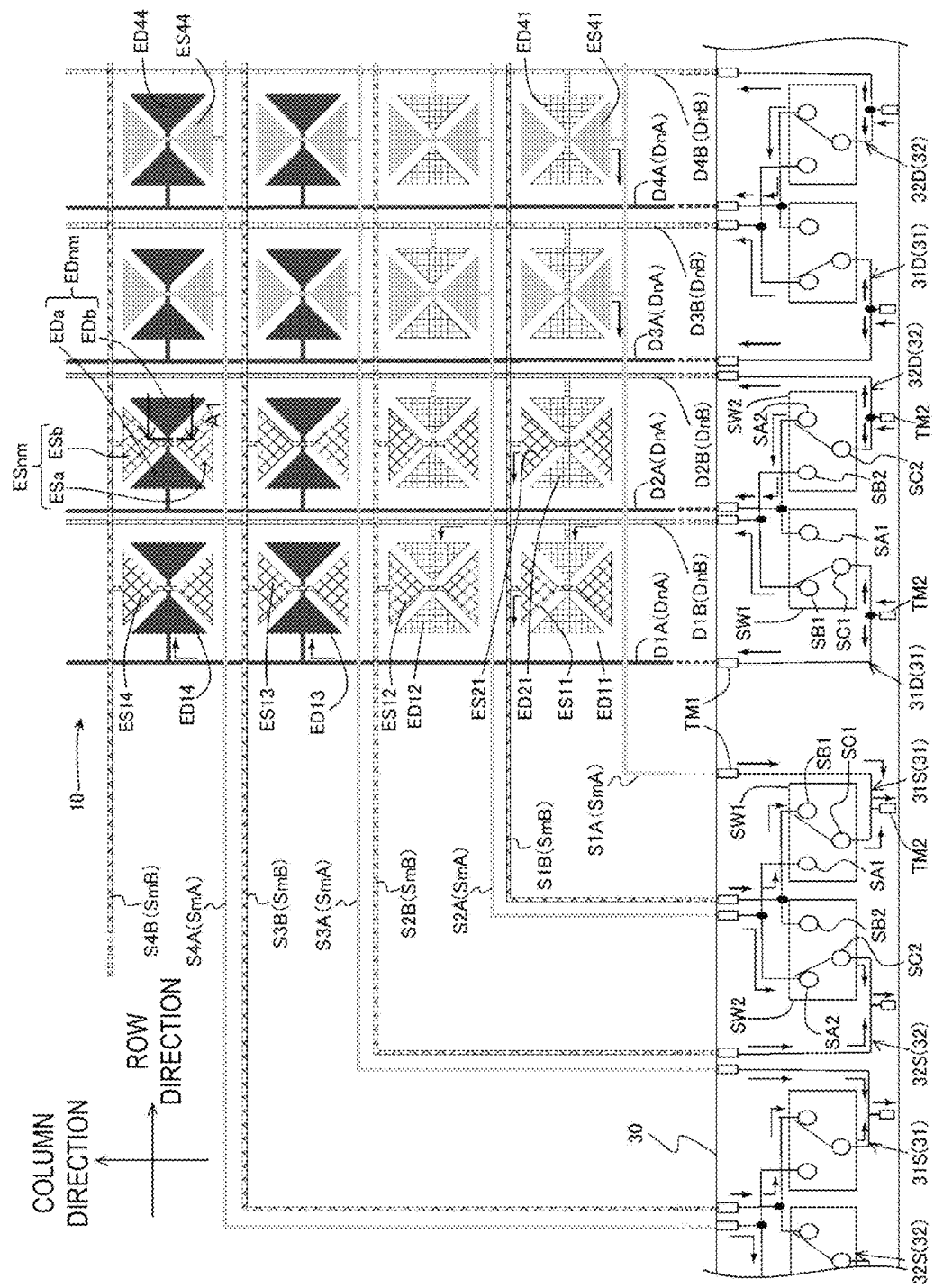
FIG. 7 is a plan view illustrating a schematic configuration of a touch sensor portion and a switching unit in a first connection state included in the touch panel device according to the embodiment.

FIG. 7 is a plan view illustrating a schematic configuration of the touch sensor portion 10 of the touch panel device 1 and the switching unit 30 in the first connection state, according to the embodiment. Note that in FIG. 7, an illustration of the flexible printed circuit 3 is omitted. In FIG. 7, a direction from the left side toward the right side with respect to the page is a row direction, and a direction from the bottom to the top with respect to the page is a column direction. The touch panel device 1 switches the connection state of the switching unit 30 between when a conductor is detected and when a non-conductor is detected. In FIG. 7, the touch panel device 1 illustrates an example of the first connection state for detecting an input object that is a conductor.

In addition to the plurality of drive wiring lines DnA and DnB and the plurality of detection wiring lines SmA and SmB, a plurality of drive electrodes EDnm connected to the plurality of drive wiring lines DnA and DnB, and a plurality of detection electrodes ESnm connected to the plurality of detection wiring lines SmA and SmB are provided in the touch sensor portion 10.

The drive wiring lines (first drive wiring lines) extending in the column direction and the drive wiring lines (second drive wiring lines) extending in the column direction are alternately arranged in the row direction. In other words, each set of the drive wiring lines DnA and the drive wiring lines DnB (a drive wiring line DnA and a drive wiring line DnB having the same value of n) is adjacent to each other in the row direction, and is sequentially arranged at a distance from each other such that the value of n increases in order. The drive wiring line DnA and the drive wiring line DnB are parallel to each other and are separated.

For example, a set of a drive wiring line D2A and a drive wiring line D2B (n=2) is provided adjacent to a set of a drive wiring line D1A and a drive wiring line D1B (n=1) in the row direction. A set of a drive wiring line D3A and a drive wiring line D3B (n=3) is provided adjacent to the set of the drive wiring line D2A and the drive wiring line D2B (n=2) in the row direction. A set of a drive wiring line D4A and a drive wiring line D4B (n=4) is provided adjacent to the set of the drive wiring line D3A and the drive wiring line D3B (n=3) in the row direction.

For example, of the drive wiring line DnA and the drive wiring line DnB in the set (that is, of the drive wiring line DnA and the drive wiring line DnB with the same value of n), the drive wiring line DnA is provided on the left side with respect to the paper, and the drive wiring line DnB is provided on the right side with respect to the paper.

A distance between the drive wiring line DnA and the drive wiring line DnB in the set is larger than a distance between the drive wiring lines DnA and DnB and the drive wiring lines DnA and DnB that are adjacent to each other. For example, a distance between the drive wiring lines D1A and D1B is larger than a distance between the drive wiring lines D1A and D1B and the drive wiring D2A and D2B (specifically, a distance between the drive wiring line D1B and the drive wiring line D2A). The same applies to the drive wiring lines D2A and D2B to D4A and D4B.

Note that in FIG. 7, only four sets of the drive wiring lines DnA and DnB are illustrated, but the number of sets of the drive wiring lines DnA and DnB is not limited to four.

The detection wiring lines (first detection wiring lines) SmA extending in the row direction and the detection wiring lines (second detection wiring lines) SmB extending in the row direction are alternately arranged in the row direction. In other words, each set of the detection wiring lines SmA extending in the row direction and the detection wiring lines SmB extending in the row direction (a detection wiring line SmA and a detection wiring line SmB having the same value of m) is provided adjacent to each other in the column direction, and is sequentially arranged at a distance from each other such that the value of m increases in order. The detection wiring line SmA and the detection wiring line SmB are parallel to each other and are separated from each other.

For example, a set of a detection wiring line S2A and a detection wiring line S2B (m=2) is provided adjacent to a set of a detection wiring line S1A and a detection wiring line S1B (m=1) in the column direction. A set of a detection wiring line S3A and a detection wiring line S3B (m=3) is provided adjacent to the set of the detection wiring line S2A and the detection wiring line S2B (m=2) in the column direction. A set of a detection wiring line S4A and a detection wiring line S4B (m=4) is provided adjacent to the set of the detection wiring line S3A and the detection wiring line S3B (m=3) in the column direction.

For example, of the detection wiring line SmA and the detection wiring line SmB in the set (that is, the detection wiring line SmA and the detection wiring line SmB with the same value of m), the detection wiring line SmA is provided on the lower side (a side closer to the switching portion 30) with respect to the page, and the detection wiring line SmB is provided on the upper side (a side far from the switching unit 30) with respect to the page.

A distance between the detection wiring line SmA and the detection wiring line SmB in the set is larger than a distance between the detection wiring lines SmA and SmB and the detection wiring lines SmA and SmB adjacent to each other. For example, a distance between the detection wiring lines S1A and S1B is larger than a distance between the detection wiring lines S1A and S1B and the detection wiring lines S2A and S2B (specifically, a distance between the detection wiring line S1B and the detection wiring line S2A). The same applies to the detection wiring lines S2A and S2B to S4A and S4B.

Note that in FIG. 7, only four sets of the detection wiring lines SmA and SmB are illustrated, but the number of sets of the detection wiring lines SmA and SmB is not limited to four.

The plurality of drive electrodes EDnm are individually connected to the drive wiring line DnA or the drive wiring line DnB. A drive signal is supplied from the connected drive wiring line DnA or drive wiring line DnB to each of the plurality of drive electrodes EDnm. As a result, each of the plurality of drive electrodes EDnm forms a capacitance with the corresponding detection electrode ESnm of the plurality of detection electrodes ESnm.

Each of the plurality of detection electrodes ESnm is connected to the detection wiring line SmA or the detection wiring line SmB. Each of the plurality of detection electrodes ESnm detects a change in a capacitance formed with the corresponding drive electrode EDnm of the plurality of drive electrodes EDnm, and outputs a detection signal that is information indicating the detected change in the capacitance to the detection wiring line SmA or the detection wiring line SmB to which each detection electrode ESnm is connected. As a result, the controller unit 6 acquires the detection signal from each of the detection wiring line SmA and the detection wiring line SmB via the switching unit 30.

Each of the drive electrode EDnm and the detection electrode ESnm is formed by using a transparent conductive material such as Indium Tin Oxide (ITO), Indium Zinc Oxide (IZO), or a silver nanowire (AgNw). The plurality of drive electrodes EDnm and the plurality of detection electrodes ESnm are provided in a matrix in the touch sensor portion 10. For example, the drive electrode EDnm and the detection electrode ESnm are one set (the drive electrode EDnm and the detection electrode ESnm having the same value of n and the same value of m), and are provided in a region surrounded between the drive wiring lines DnA and DnB that are one set and between the detection wiring lines SmA and SmB that are one set.

Each set of the drive electrodes EDnm and the detection electrodes ESnm is arranged away from each other in an extending direction of the drive wiring lines DnA and DnB, that is, in the column direction, such that the value of n increases in order. In addition, each set of the drive electrodes EDnm and the detection electrodes ESnm is arranged away from each other in an extending direction of the detection wiring lines SmA and SmB, that is, in the row direction, such that the value of m increases in order.

For example, a set of a drive electrode ED11 and a detection electrode ES11 (n=1, m=1) is provided in a region surrounded between the drive wiring lines D1A and D1B and between the detection wiring lines S1A and S1B. A set of a drive electrode ED12 and a detection electrode ES12 (n=1, m=2) is provided in a region surrounded between the drive wiring lines D1A and D1B and between the detection wiring lines S2A and S2B. A set of a drive electrode ED13 and a detection electrode ES13 (n=1, m=3) is provided in a region surrounded between the drive wiring lines D1A and D1B and between the detection wiring lines S3A and S3B. A set of a drive electrode ED14 and a detection electrode ES14 (n=1, m=4) is provided in a region surrounded between the drive wiring lines D1A and D1B and between the detection wiring lines S4A and S4B.

For example, a set of a drive electrode ED21 and a detection electrode ES21 (n=2, m=1) is provided in a region surrounded between the drive wiring lines D2A and D2B and between the detection wiring lines S1A and S1B. A set of a drive electrode ED31 and a detection electrode ES31 (n=3, m=1) is provided in a region surrounded between the drive wiring lines D3A and D3B and between the detection wiring lines S1A and S1B. A set of a drive electrode ED41 and a detection electrode ES41 (n=4, m=1) is provided in a region surrounded between the drive wiring lines D4A and D4B and between the detection wiring lines S1A and S1B. A set of a drive electrode ED44 and a detection electrode ES44 (n=4, m=4) is provided in a region surrounded between the drive wiring lines D4A and D4B and between the detection wiring lines S4A and S4B.

A distance between the drive electrode EDnm and the detection electrode ESnm in the set is smaller than a distance between the drive electrode EDnm and the detection electrode ESnm and adjacent another set of the drive electrode EDnm and the detection electrode ESnm. For example, a distance between the drive electrode ED11 and the detection electrode ES11 is smaller than a distance between the drive electrode ED11 and the detection electrode ES11, and the drive electrode ED12 and the detection electrode ES12, and is smaller than a distance between the drive electrode ED11 and the detection electrode ES11, and the drive electrode ED21 and the detection electrode ES21.

Here, the drive electrode EDnm and the detection electrode ESnm in the set are a set of electrodes that are used, for example, to detect the touch position of the input object in the first connection state, or that are used, for example, to detect a change in the short distance capacitance among a plurality of changes in capacitances (the short distance, the medium distance, the long distance, and the like) that are used to detect the touch position of the input object in the second connection state. The drive electrode EDnm and the detection electrode ESnm in the set are a pair of electrodes having the closest distance between the electrodes that detect the change in the capacitance. Thus, in the case of the first connection state, the touch panel device 1 can detect a touch position of a conductor (for example, a pen such as an active pen, or a passive pen) having a relatively narrow area (touch area) when the conductor contacts the surface (touch surface) of the touch panel portion 2 with high definition, compared with the case of the second connection state.

In addition, a set of the drive electrode EDnm and the detection electrode ESnm, and another set of the drive electrode EDnm and the detection electrode ESnm that are adjacent to the set of the drive electrode EDnm and the detection electrode ESnm are pairs of electrodes that are used to detect, for example, a change in a short distance capacitance, among the plurality of changes in capacitances (a short distance, a medium distance, a long distance, and the like) that are used to detect a touch position of an input object, in the second connection state rather than in the first connection state. A distance between the set of the drive electrode EDnm and the detection electrode ESnm and the adjacent other set of the drive electrode EDnm and the detection electrode ESnm is longer than a distance between the drive electrode EDnm and the detection electrode ESnm in the set. Thus, unlike in the case of the first connection state, in the case of the second connection state, the touch panel device 1 can determine a conductor or a non-conductor, can detect a touch position of a conductor (for example, a finger) having a relatively large area (touch area) when the conductor contacts the surface (touch surface) of the touch panel portion 2, and can detect a touch position of a non-conductor (for example, a gloved finger, an eraser, or the like).

For example, the drive electrode EDnm and the detection electrode ESnm in the set are shaped to be rectangular in combination in a plan view. For example, the drive electrode EDnm and the detection electrode ESnm are partially overlapped.

In the example illustrated in FIG. 7, the drive electrode EDnm includes a first region EDa on a side closer to the drive wiring line DnA, and a second region EDb on a side closer to the drive wiring line DnB, and the first region EDa and the second region EDb are connected by a connection region having a width smaller than a width of each of the first region EDa and the second region EDb. In other words, in the drive electrode EDnm, the first region EDa and the second region EDb that are aligned in the row direction are connected by the connection region.

The detection electrode ESnm includes a first region ESa on a side closer to the detection wiring line SmA and a second region ESb on a side closer to the detection wiring line SmB, and the first region ESa and the second region ESb are connected by a connection region having a width smaller than a width of each of the first region ESa and the second region ESb. In other words, in the detection electrode ESnm, the first region ESa and the second region ESb that are aligned in the column direction are connected by the connection region. Then, the connection region of the drive electrode EDnm overlaps with the connection region of the detection electrode ESnm.

Figure 8:
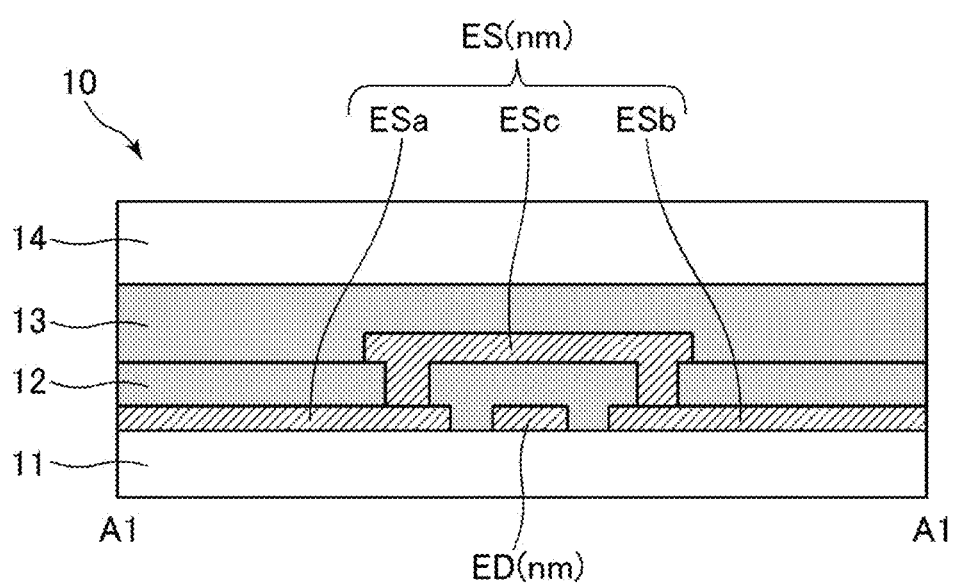
FIG. 8 is a cross-sectional view taken along the line A1-A1 illustrated in FIG. 7.

FIG. 8 is a cross-sectional view taken along the line A1-A1 illustrated in FIG. 7. For example, the first region ESa and the second region ESb of the detection electrode ESnm and the drive electrode EDnm are provided on the touch sensor substrate 11. Further, a transparent first resin layer 12 having insulating properties such as acrylic is provided on the touch sensor substrate 11 so as to cover the first region ESa and the second region ESb of the detection electrode ESnm and the drive electrode EDnm.

Further, a connection region ESc of the detection electrode ESnm is provided on the first resin layer 12 so as to overlap with the first region ESa and the second region ESb of the detection electrode ESnm and the connection region of the drive electrode EDnm. Further, the connection region ESc is electrically connected to each of the first region ESa and the second region ESb of the detection electrodes ESnm through contact holes formed in the first resin layer 12. Further, a transparent second resin layer 13 having insulating properties such as acrylic is provided on the first resin layer 12 so as to cover the connection region ESc. Further, a protection layer 14 made from transparent resin having insulating properties or the like is provided on the second resin layer 13. The surface of the protection layer 14 is a touch surface that the input object or the like is caused to contact or approach in order that a user inputs a touch position to the touch panel device 1. Note that a lamination order of the connection region ESc of the detection electrode ESnm and the connection region of the drive electrode EDnm is not limited to the order described using FIG. 8, but may be reversed.

Returning to FIG. 7, the plurality of drive electrodes EDnm are alternately connected for every first predetermined constant number (for example, every two) of the drive electrodes along the column direction to the drive wiring line DnA and drive wiring line DnB adjacent to each other. In each of the plurality of drive electrodes EDnm, the second region EDb and the first region EDa are alternately connected to the drive wiring line DnB or the drive wiring line DnA for every first predetermined constant number of the drive electrodes EDnm along the column direction. As an example, in the present embodiment, the first predetermined constant number is two, but is not limited to two.

For example, in each of the plurality of drive electrodes EDnm, the second region EDb and the first region EDa are alternately connected to the drive wiring line DnB or the drive wiring line DnA for every two of the drive electrodes along the column direction. Specifically, for example, the drive electrodes ED11 and ED12 are not connected to the drive wiring line D1A, and each second region EDb of the drive electrodes ED11 and ED12 is connected to the drive wiring line D1B. Furthermore, each first region EDa of the drive electrodes ED13 and ED14 is connected to the drive wiring line D1A, and the drive electrodes ED13 and ED14 are not connected to the drive wiring line D1B. For example, the drive electrodes ED21 and ED22 are not connected to the drive wiring line D2A, and each second region EDb of the drive electrodes ED21 and ED22 is connected to the drive wiring line D2B. Furthermore, each first region EDa of the drive electrodes ED23 and ED24 is connected to the drive wiring line D2A, and the drive electrodes ED23 and ED24 are not connected to the drive wiring line D2B. For example, the drive electrodes ED31 and ED32 are not connected to the drive wiring line D3A, and each second region EDb of the drive electrodes ED31 and ED32 is connected to the drive wiring line D3B. Furthermore, each first region EDa of the drive electrodes ED33 and ED34 is connected to the drive wiring line D3A, and the drive electrodes ED33 and ED34 are not connected to the drive wiring line D3B. For example, the drive electrodes ED41 and ED42 are not connected to the drive wiring line D4A, and each second region EDb of the drive electrodes ED41 and ED42 is connected to the drive wiring line D4B. Furthermore, each first region EDa of the drive electrodes ED43 and ED44 is connected to the drive wiring line D4A, and the drive electrodes ED43 and ED44 are not connected to the drive wiring line D4B.

The plurality of detection electrodes ESnm are alternately connected to the detection wiring line SmA and the detection wiring line SmB adjacent to each other along the row direction for every second predetermined constant number (for example, every two) of the detection electrodes ESnm. In each of the plurality of detection electrodes ESnm, the second region ESb and the first region ESa are alternately connected to the detection wiring line SmB or the detection wiring line SmA for every second predetermined constant number (for example, every two) of the detection electrodes ESnm along the row direction. In other words, the plurality of detection electrodes ESnm are provided such that the second predetermined constant number of the detection electrodes ESnm connected to the detection wiring line SmA and the second predetermined constant number of the detection electrodes ESnm connected to the detection wiring line SmB are alternately arranged in the row direction. As an example, in the present embodiment, the second predetermined constant number is two, but is not limited to two.

For example, in each of the plurality of detection electrodes ESnm, the second region ESb and the first region ESa are alternately connected to the detection wiring line SmB or the detection wiring line SmA for every two detection electrodes ESnm along the row direction. Specifically, for example, the detection electrodes ES11 and ES21 are not connected to the detection wiring line S1A, and each second region ESb of the detection electrodes ES11 and ES21 is connected to the detection wiring line S1B. Furthermore, each first region ESa of the detection electrodes ES31 and ES41 is connected to the detection wiring line S1A, and the detection electrodes ES31 and ES41 are not connected to the detection wiring line S1B. For example, the detection electrodes ES12 and ES22 are not connected to the detection wiring line S2A, and each second region ESb of the detection electrodes ES12 and ES22 is connected to the detection wiring line S2B. Furthermore, each first region ESa of the detection electrodes ES32 and ES42 is connected to the detection wiring line S2A, and the detection electrodes ES32 and ES42 are not connected to the detection wiring line S2B. For example, the detection electrodes ES13 and ES23 are not connected to the detection wiring line S3A, and each second region ESb of the detection electrodes ES13 and ES23 is connected to the detection wiring line S3B. Furthermore, each first region ESa of the detection electrodes ES33 and ES43 is connected to the detection wiring line S3A, and the detection electrodes ES33 and ES43 are not connected to the detection wiring line S3B. For example, the detection electrodes ES14 and ES24 are not connected to the detection wiring line S4A, and each second region ESb of the detection electrodes ES14 and ES24 is connected to the detection wiring line S4B. Furthermore, each first region ESa of the detection electrodes ES34 and ES44 is connected to the detection wiring line S4A, and the detection electrodes ES34 and ES44 are not connected to the detection wiring line S4B.

The switching unit 30 includes a plurality of terminals TM1, a plurality of terminals TM2, a plurality of switch portions SW1, and a plurality of switch portions SW2. Among the plurality of terminals TM1 and the plurality of terminals TM2, the plurality of terminals TM1 are provided on a side closer to the touch sensor portion 10, and the plurality of terminals TM2 are provided on a side closer to the controller unit 6.

The plurality of terminals TM1 are individually provided for each of the drive wiring lines DnA and DnB and the detection wiring lines SmA and SmB. The drive wiring lines DnA and DnB and the detection wiring lines SmA and SmB that are drawn from the touch sensor portion 10 are individually connected to each of the plurality of terminals TM1. Each of the plurality of terminals TM1 is a terminal configured to supply a drive signal to the drive wiring line DnA or DnB and configured to acquire a detection signal from the detection wiring line SmA or SmB. For example, the number of the plurality of terminals TM1 provided in the switching portion 30 is at least the same as the number of the drive wiring lines DnA and DnB and detection wiring lines SmA and SmB provided in the touch sensor portion 10.

Each of the plurality of terminals TM2 is connected to the controller unit 6, and is a terminal configured to supply a drive signal from the controller unit 6 and configured to supply a detection signal to the controller unit 6. In the switching unit 30, each terminal TM2 is connected to a plurality of terminals TM1. For example, each terminal TM2 is connected to two terminals TM1 adjacent to each other. For example, the number of the plurality of terminals TM2 provided in the switching unit 30 is less than the number of the plurality of terminals TM1 (that is, the number of the drive wiring lines DnA and DnB and the detection wiring lines SmA and SmB).

In the switching unit 30, by switching the switch portions SW1 and the switch portions SW2, the first connection state for detecting an input object that is a conductor and the second connection state for detecting an input object that is a conductor and a non-conductor are switched.

The first connection state is a state in which the drive wiring line DnA and the drive wiring line DnB adjacent to each other are connected. Further, the first connection state is a state in which the detection wiring line SmA and the detection wiring line SmB adjacent to each other are connected. In other words, the first connection state is a state in which the drive wiring line DnA and the drive wiring line DnB in the set are connected, and the detection wiring line SmA and the detection wiring line SmB in the set are connected.

The second connection state is a state in which the drive wiring lines DnA adjacent to each other are connected to each other, and the drive wiring lines DnB adjacent to each other are connected to each other. Furthermore, the detection wiring lines SmA adjacent to each other are connected to each other, and the detection wiring lines SmB adjacent to each other are connected to each other.

In the switching unit 30, a plurality of paths connecting the plurality of terminals TM2 and the plurality of terminals TM1 includes a plurality of paths 31 including the switch portions SW1 and a plurality of paths 32 including the switch portions SW2 that are alternately arranged in the row direction (that is, in a longitudinal direction of the switching unit 30). The plurality of paths 31 includes a plurality of paths 31D connected to the plurality of drive wiring lines DnA and DnB and a plurality of paths 31S connected to the plurality of detection wiring lines SmA and SmB.

The path 31D includes a first path and a second path that are branched into two from the terminal TM2. In the first path that is one path of the path 31D, the terminal TM2 and the terminal TM1 connected to the drive wiring line DnA (for example, the drive wiring line D1A) are connected. In the second path that is the other path of the path 31D, the terminal TM2 and the switch portion SW1 are connected. Via the switch portion SW1, the terminal TM2 is connected to the terminal TM1 connected to the drive wiring line DnB (for example, the drive wiring line D1B) being in a set with the drive wiring line DnA (for example, the drive wiring line D1A) to which the first path is connected, or to the terminal TM1 connected to the drive wiring line DnA (for example, the drive wiring line D2A) that is adjacent to the drive wiring line DnA (for example, the drive wiring line D1A) to which the first path is connected.

The path 32D includes a first path and a second path that are branched into two from the terminal TM2. In the first path that is one path of the path 32D, the terminal TM2 and the switch portion SW2 are connected, and the terminal TM2 is connected, via the switch portion SW2, to the terminal TM1 connected to the drive wiring line DnB (for example, the drive wiring line D1B) connected to the switch portion SW1, or to the terminal TM1 connected to the drive wiring line DnA (for example, the drive wiring line D2A) connected to the switch portion SW1.

The plurality of switch portions SW1 and SW2 are individually provided in paths that connect the plurality of terminals TM2 and the plurality of terminals TM1. The switch portion SW1 includes a first terminal SB1, a second terminal SA1, and a third terminal SC1. The switch portion SW2 includes a first terminal SA2, a second terminal SB2, and a third terminal SC2.

The switch portion SW1 is capable of switching an electrical connection state between the third terminal SC1 and the first terminal SB1 or the second terminal SA1 based on a switching instruction from the controller unit 6. The switch portion SW2 is capable of switching an electrical connection state between the third terminal SC2 and the first terminal SA2 or the second terminal SB2 based on a switching instruction from the controller unit 6.

Of the switch portion SW1, the first terminal SB1 is connected to the terminal TM1 connected to the drive wiring line DnB (for example, the drive wiring line D1B) in a set with the drive wiring line DnA (for example, the drive wiring line D1A) to which the first path is connected, and is connected to the second terminal SB2 of the switch portion SW2. Of the switch portion SW1, the second terminal SA1 is connected to the terminal TM1 connected to the drive wiring line DnA (for example, the drive wiring line D2A) adjacent to the drive wiring line DnA (for example, the drive wiring line D1A) to which the first path is connected, and is connected to the first terminal SA2 of the switch portion SW2. Of the switch portion SW1, the third terminal SC1 is connected to the first path and the terminal TM2.

Of the switch portion SW2, the first terminal SA2 is connected to the terminal TM1 connected to the second terminal SA1 of the switch portion SW1 and the drive wiring line DnA (for example, the drive wiring line D2A). Of the switch portion SW2, the second terminal SB2 is connected to the first terminal SB1 of the switch portion SW1 and the drive wiring line DnB (for example, the drive wiring line D1B). Of the switch portion SW2, the third terminal SC2 is connected to the second path and the terminal TM2. The drive wiring line DnA (for example, the drive wiring line D2A) to which the first terminal SA2 of the switch portion SW2 is connected via the terminal TM1 is a set with the drive wiring line DnB (for example, the drive wiring line D2B) to which the second path is connected via the terminal TM1. The drive wiring line DnB (for example, the drive wiring line D1B) to which the second terminal SB2 of the switch portion SW2 is connected via the terminal TM1 is adjacent to the drive wiring line DnB (for example, the drive wiring line D2B) to which the second path is connected via the terminal TM1.

The path 31S includes a first path and a second path that are branched into two from the terminal TM2. In the first path that is one path of the path 31S, the terminal TM2 and the terminal TM1 connected to the detection wiring line SmA (for example, the detection wiring line S1A) are connected. In the second path that is the other path of the path 31S, the terminal TM2 and the switch portion SW1 are connected. Via the switch portion SW1, the terminal TM2 is connected to the terminal TM1 connected to the detection wiring line SmB (for example, the detection wiring line S1B) that is a set with the detection wiring line SmA (for example, the detection wiring line S1A) to which the first path is connected, or is connected to the terminal TM1 connected to the detection wiring line SmA (for example, the detection wiring line S2A) that is adjacent to the detection wiring line SmA (for example, the detection wiring line S1A) to which the first path is connected.

The path 32S includes a first path and a second path that are branched into two from the terminal TM2. In the first path that is one path of the path 32S, the terminal TM2 and the switch portion SW2 are connected, and via the switch portion SW2, the terminal TM2 is connected to the terminal TM1 connected to the detection wiring line SmB (for example, the detection wiring line S1B) connected to the switch portion SW1, or is connected to the terminal TM1 connected to the detection wiring line SmA (for example, the detection wiring line S2A) connected to the switch portion SW1.

Of the switch portion SW1, the first terminal SB1 is connected to the terminal TM1 connected to the detection wiring line SmB (for example, the detection wiring line S1B) that is a set with the detection wiring line SmA (for example, the detection wiring line S1A) to which the first path is connected, and the second terminal SB2 of the switch portion SW2. Of the switch portion SW1, the second terminal SA1 is connected to the terminal TM1 connected to the detection wiring line SmA (for example, the detection wiring line S2A) adjacent to the detection wiring line SmA (for example, the detection wiring line S1A) to which the first path is connected, and is connected to the first terminal SA2 of the switch portion SW2. Of the switch portion SW1, the third terminal SC1 is connected to the first path and the terminal TM2.

The first terminal SA2 of the switch portion SW2 is connected to the second terminal SA1 of the switch portion SW1 and the terminal TM1 connected to the detection wiring line SmA (for example, the detection wiring line S2A). The second terminal SB2 of the switch portion SW2 is connected to the first terminal SB1 of the switch portion SW1 and the detection wiring line SmB (for example, the detection wiring line S1B). Of the switch portion SW2, the third terminal SC2 is connected to the second path and the terminal TM2. The detection wiring line SmA (for example, the detection wiring line S2A) to which the first terminal SA2 of the switch portion SW2 is connected via the terminal TM1 is a set with the detection wiring line SmB (for example, the detection wiring line S2B) to which the second path is connected via the terminal TM1. The detection wiring line SmB (for example, the detection wiring line S1B) to which the second terminal SB2 of the switch portion SW2 is connected via the terminal TM1 is adjacent to the detection wiring line SmB (for example, the detection wiring line S2B) to which the second path is connected via the terminal TM1.

Next, with reference to FIG. 7, an operation in the first connection state in which the touch panel device 1 detects a touch position of an input object that is a conductor will be described.

The controller unit 6 outputs, to the switching unit 30, a switching instruction signal indicating switching to the first connection state in order to detect an input object that is a conductor. Then, when the switching unit 30 receives, from the controller unit 6, the switching instruction signal indicating the switching to the first connection state, the switching unit 30 electrically connects the third terminal SC1 of the switch portion SW1 to the first terminal SB1 among the first terminal SB1 and the second terminal SA1. Furthermore, the switching unit 30 electrically connects the third terminal SC2 of the switch portion SW2 to the first terminal SA2 among the first terminal SA2 and the second terminal SB2.

As a result, in the path 31D (31), the drive wiring line DnA (for example, the drive wiring line D1A) and the drive wiring line DnB (for example, the drive wiring line D1B) that are a set are electrically connected. Additionally, in the path 32D (32), the drive wiring line DnA (for example, the drive wiring line D2A) and the drive wiring line DnB (for example, the drive wiring line D2B) that are a set are electrically connected.

Further, in the path 31S (31), the detection wiring line SmA (for example, the detection wiring line S1A) and the detection wiring line SmB (for example, the detection wiring line S1B) that are a set are electrically connected. Further, in the path 32S (32), the detection wiring line SmA (for example, the detection wiring line S2A) and the detection wiring line SmB (for example, the detection wiring line S2B) that are a set are electrically connected.

Then, a drive signal supplied from the controller unit 6 to the terminal TM2 is branched at the terminal TM2 to be supplied to the drive wiring line DnA (for example, the drive wiring line D1A) and the drive wiring line DnB (for example, the drive wiring line D1B) that are a set through the first path and the second path in the path 31D (31).

Then, the drive signal supplied to the drive wiring line DnA (for example, the drive wiring line D1A) is supplied to the drive electrodes EDnm (for example, the drive electrodes ED13 and ED14) connected to the drive wiring line DnA (for example, the drive wiring line D1A). The drive signal supplied to the drive wiring line DnB (for example, the drive wiring line D1B) is supplied to the drive electrodes EDnm (for example, the drive electrodes ED11 and ED12) connected to the drive wiring line DnB (for example, the drive wiring line D1B).

Thus, a plurality of drive electrodes (for example, the drive electrodes ED11, ED12, ED13, and ED14) that are connected to each of the drive wiring lines DnA (for example, the drive wiring line D1A) and the drive wiring line DnB (for example, the drive wiring line D1B) adjacent to the drive wiring line DnA (for example, the drive wiring line D1A) can be integrally driven. In other words, the drive electrodes can be integrally driven for every adjacent columns.

In addition, with this, each of the detection electrodes ESnm (for example, the detection electrodes ES13 and ES14) that are sets with the drive electrodes EDnm (for example, the drive electrodes ED13 and ED14) connected to the drive wiring line DnA (for example, the drive wiring line D1A) supplies a detection signal indicating a change in a short distance capacitance that changes depending on a distance from an input object, to the detection wiring line SmB to which each detection electrode ESnm is connected. Specifically, for example, the detection electrode ES13 that is a set with the drive electrode ED13 supplies a detection signal indicating a change in a capacitance formed with the drive electrode ED13, to the detection wiring line S3B connected to the detection electrode ES13. Further, for example, the detection electrode ES14 that is a set with the drive electrode ED14 supplies a detection signal indicating a change in a capacitance formed with the drive electrode ED14, to the detection wiring line S4B connected to the detection electrode ES14.

Further, each of the detection electrodes ESnm (for example, the detection electrodes ES11 and ES12) that are sets with the drive electrodes EDnm (for example, the drive electrodes ED11 and ED12) connected to the drive wiring line DnB (for example, the drive wiring line D1B) supplies a detection signal indicating a change in a short distance capacitance that changes depending on a distance from an input object, to the detection wiring line SmB to which each detection electrode ESnm is connected. Specifically, for example, the detection electrode ES11 that is a set with the drive electrode ED11 supplies a detection signal indicating a change in a capacitance formed with the drive electrode ED11, to the detection wiring line S1B connected to the detection electrode ES11. Further, for example, the detection electrode ES12 that is a set with the drive electrode ED12 supplies a detection signal indicating a change in a capacitance formed with the drive electrode ED12, to the detection wiring line S2B connected to the detection electrode ES12.

Furthermore, in the path 31S (31), the detection signal supplied to the detection wiring line SmA (for example, the detection wiring line S1A) passes through the first path, the detection signal supplied to the detection wiring line SmB (for example, the detection wiring line S1B) passes through the second path, and these detection signals are merged at the terminal TM2. Then, the detection signal merged at the terminal TM2 is supplied to the controller unit 6.

Furthermore, in the path 32S (32), the detection signal supplied to the detection wiring line SmA (for example, the detection wiring line S2A) passes through the first path, the detection signal supplied to the detection wiring line SmB (for example, the detection wiring line S2B) passes through the second path, and these detection signals are merged in the terminal TM2. Then, the detection signal merged at the terminal TM2 is supplied to the controller unit 6.

As described above, the plurality of detection electrodes (for example, the detection electrodes ES11, ES12, ES13, and ES14) that are connected to the detection wiring line SmA (for example, the detection wiring line S1A) and the detection wiring line SmB (for example, the detection wiring line S1B) adjacent to the detection wiring line SmA (for example, the detection wiring line S1A) can be integrally driven. In other words, the detection electrodes can be integrally driven for every adjacent rows.

In this way, the controller unit 6 can detect, by calculation, a touch position based on a change in a capacitance caused by the proximity of an input object that is a conductor for each of sets of the drive electrodes EDnm and the detection electrodes ESnm.

In the first connection state, the controller 6 can detect a touch position for each of the sets of the drive electrodes EDnm (for example, the drive electrode ED11) and the detection electrodes ESnm (for example, the detection electrode ES11), and thus the controller unit 6 can detect the touch position with high definition.

In the case where a touch position of an input object that is a conductor is detected in the touch panel device 1, a change in a capacitance between the drive electrode EDnm and the detection electrode ESnm that are positioned at a short distance only need to be detected, and a change in a capacitance between the drive electrode EDnm and the detection electrode ESnm that are positioned at a medium distance or a long distance may not be detected.

Note that, in the touch panel device 1, even in the case where a touch position of an input object that is a conductor is detected, in addition to the change in the capacitance between the drive electrode EDnm and the detection electrode ESnm that are positioned at a short distance, the change in the capacitance at a medium distance or a long distance (for example, a change in a capacitance between the drive electrode EDnm and the detection electrode ESnm that are separated from each other in the row direction or the column direction) may be detected. As a result, the accuracy of detecting the touch position of the input object that is the conductor can be improved.

Next, by using FIG. 9 to FIG. 13, an operation in the second connection state in which the touch panel device 1 detects a touch position of an input object that is a conductor and a non-conductor will be described.

Figure 9:
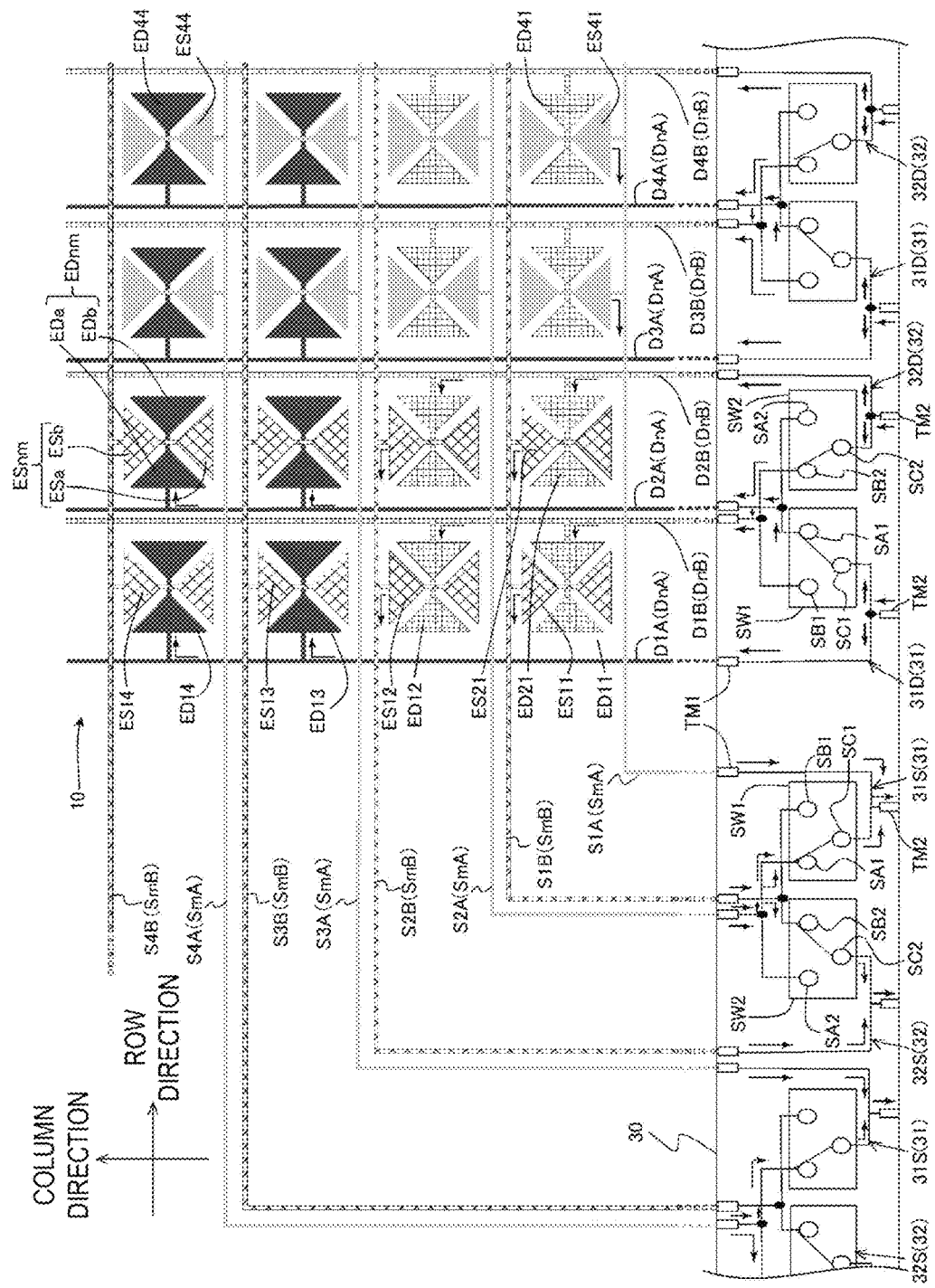
FIG. 9 is a plan view illustrating a schematic configuration of a touch sensor portion and a switching unit in a second connection state included in the touch panel device according to the embodiment.

FIG. 9 is a plan view illustrating a schematic configuration of the touch sensor portion 10 and the switching unit 30 in the second connection state of the touch panel device 1 according to the embodiment.

The controller unit 6 outputs, to the switching unit 30, a switching instruction signal indicating switching to the second connection state in order to detect an input object that is a non-conductor. Then, when the switching unit 30 receives, from the controller unit 6, the switching instruction signal indicating the switching to the second connection state, the switching unit 30 electrically connects the third terminal SC1 of the switch portion SW1 to the second terminal SA1 among the first terminal SB1 and the second terminal SA1. Furthermore, the switching unit 30 electrically connects the third terminal SC2 of the switch portion SW2 to the second terminal SB2 among the first terminal SA2 and the second terminal SB2.

As a result, in the path 31D (31), the drive wiring lines DnA adjacent to each other (for example, the drive wiring line D1A and the drive wiring line D2A) among the plurality of drive wiring lines DnA are electrically connected to each other. Further, in the path 32D (32), the drive wiring lines DnB adjacent to each other (for example, the drive wiring line D1B and the drive wiring line D2B) among the plurality of drive wiring lines DnB are electrically connected to each other.

Further, in the path 31S (31), the detection wiring lines SmA adjacent to each other (for example, the detection wiring line S1A and the detection wiring line S2A) among the plurality of detection wiring lines SmA are electrically connected to each other. Further, in the path 32S (32), the detection wiring lines SmB adjacent to each other (for example, the detection wiring line S1B and the detection wiring line S2B) among the plurality of detection wiring lines SmB are electrically connected to each other.

A drive signal supplied from the controller unit 6 to the terminal TM2 is branched at the terminal TM2 to be supplied to each of the drive wiring lines DnA (for example, the drive wiring line D1A and the drive wiring line D2A) adjacent to each other through the first path and the second path in the path 31D (31).

Then, the drive signal supplied to each of the drive wiring lines DnA adjacent to each other (for example, the drive wiring line D1A and the drive wiring line D2A) is supplied to the drive electrodes (for example, the drive electrodes ED13, ED14, ED23, and ED24) connected to each of the drive wiring lines DnA (for example, the drive wiring line D1A and the drive wiring line D2A) adjacent to each other.

As a result, each of the detection electrodes ESnm (for example, the detection electrodes ES13, ES14, ES23, and ES24) that are sets with the drive electrodes EDnm (for example, the drive electrodes ED13, ED14, ED23, and ED24) connected to each of the drive wiring lines DnA (for example, the drive wiring line D1A and the drive wiring line D2A) adjacent to each other supplies a detection signal indicating a change in a short distance capacitance that changes depending on a distance from the input object, to the detection wiring line SmB to which each detection electrode ESnm is connected. Specifically, for example, each of the detection electrodes ES13 and ES23 supplies a detection signal to the detection wiring line S3B connected to each of the detection electrodes ES13 and ES23, and each of the detection electrodes ES14 and ES24 supplies a detection signal to the detection wiring line S4B connected to each of the detection electrodes ES14 and ES24.

Furthermore, the drive signal supplied from the controller unit 6 to the terminal TM2 is branched at the terminal TM2 to be supplied to each of the drive wiring lines DnB (for example, the drive wiring line D1B and the drive wiring line D2B) adjacent to each other through the first path and the second path in the path 32D (32).

Then, the drive signal supplied to each of the drive wiring lines DnB (for example, the drive wiring line D1B and the drive wiring line D2B) adjacent to each other is supplied to the drive electrodes (for example, the drive electrodes ED11, ED12, ED21, and ED22) connected to each of the drive wiring lines DnB (for example, the drive wiring line D1B and the drive wiring line D2B) adjacent to each other.

As a result, each of the detection electrodes ESnm (for example, the detection electrodes ES11, ES12, ES21, and ES22) that are sets with the drive electrodes EDnm (for example, the drive electrodes ED11, ED12, ED21, and ED22) connected to each of the drive wiring lines DnB (for example, the drive wiring line D1B and the drive wiring line D2B) adjacent to each other supplies a detection signal indicating a change in a short distance capacitance that changes depending on a distance from an input object, to the detection wiring line SmB to which each drive electrode EDnm is connected. Specifically, for example, each of the detection electrodes ES11 and ES21 supplies the detection signal to the detection wiring line S1B connected to each of the detection electrodes ES11 and ES21, and each of the detection electrodes ES12 and ES22 supplies the detection signal to the detection wiring line S2B connected to each of the detection electrodes ES12 and ES22.

In the path 31S (31), the detection signal supplied to each of the detection wiring lines SmA (for example, the detection wiring line S1A and the detection wiring line S2A) adjacent to each other is merged at the terminal TM2 through the first path and the second path. Then, the detection signal merged at the terminal TM2 is supplied to the controller unit 6.

Furthermore, in the path 32S (32), the detection signal supplied to each of the detection wiring lines SmB (for example, the detection wiring line S1B and the detection wiring line S2B) adjacent to each other is merged at the terminal TM2 through the first path and the second path. Then, the detection signal merged at the terminal TM2 is supplied to the controller unit 6.

Accordingly, the touch position of the input object that is the conductor and the non-conductor in the touch sensor portion 10 can be detected in the controller unit 6.

In the case of detecting the touch position of the input object that is the conductor and the non-conductor, in other words, in the case of the second connection state, the drive wiring lines DnA (for example, the drive wiring line D1A and the drive wiring line D2A) adjacent to each other among the plurality of drive wiring lines DnA are connected at the switching unit 30 and the drive wiring lines DnB (for example, the drive wiring line D1B and the drive wiring line D2B) adjacent to each other among the plurality of drive wiring lines DnB are connected at the switching unit 30.

Due to this, the plurality of drive electrodes EDnm are integrally driven as a drive electrode for every first predetermined constant number of drive electrodes EDnm (for example, for every two drive electrodes EDnm) in the row direction and the column direction. For example, the drive electrodes ED11, ED12, ED21, and ED22 are integrally driven as a drive electrode. In addition, for example, the drive electrodes ED13, ED14, ED23, and ED24 are integrally driven as a drive electrode.

Further, in the case of the second connection state, the detection wiring lines SmA (for example, the detection wiring line S1A and the detection wiring line S2A) adjacent to each other among the plurality of detection wiring lines SmA are connected in the switching unit 30, and the detection wiring lines SmB (for example, the detection wiring line S1B and the detection wiring line S2B) adjacent to each other among the plurality of detection wiring lines SmB are connected in the switching unit 30.

Thus, the plurality of detection electrodes ESnm are integrally driven as a detection electrode for every second predetermined constant number of detection electrodes ESnm (for example, every two detection electrode ESnm) in the row direction and the column direction. For example, the detection electrodes ES11, ES12, ES21, and ES22 are integrally driven as a detection electrode. Further, for example, the detection electrodes ES13, ES14, ES23, and ES24 are integrally driven as a detection electrode. Further, for example, the detection electrodes ES31, ES32, ES41, and ES42 are integrally driven as a detection electrode.

That is, in the case of the second connection state (when a touch position of an input object that is a non-conductor), compared with the case of the first connection state (when a touch position of an input object that is a conductor), it can be expressed that a pitch at which the integrally driven drive electrodes and the integrally driven detection electrodes are arranged in a matrix is double in the row direction and the column direction.

As a result, not only is the touch position of the input object that is the conductor detected, but also the touch position of the input object that is the non-conductor (for example, a gloved fingertip, an eraser with a larger area than an area of a pen tip that is a conductor, or the like), and the controller unit 6 can perform calculation accurately and easily. In addition, since the number of terminals does not increase, a special touch panel controller having a large number of terminals with high cost is unnecessary, and a general-purpose touch panel controller can be used, so the cost can be reduced.

In the touch sensor device 1 according to the present embodiment, in the case of the second connection state, a change in a capacitance between the integrally driven drive electrodes and the integrally driven detection electrodes are acquired for each of a plurality of distances of a short distance, a medium distance, and a long distance, a conductor or a non-conductor is determined, and thus, a touch position of an input object that is a conductor or a non-conductor is detected.

Figure 10:
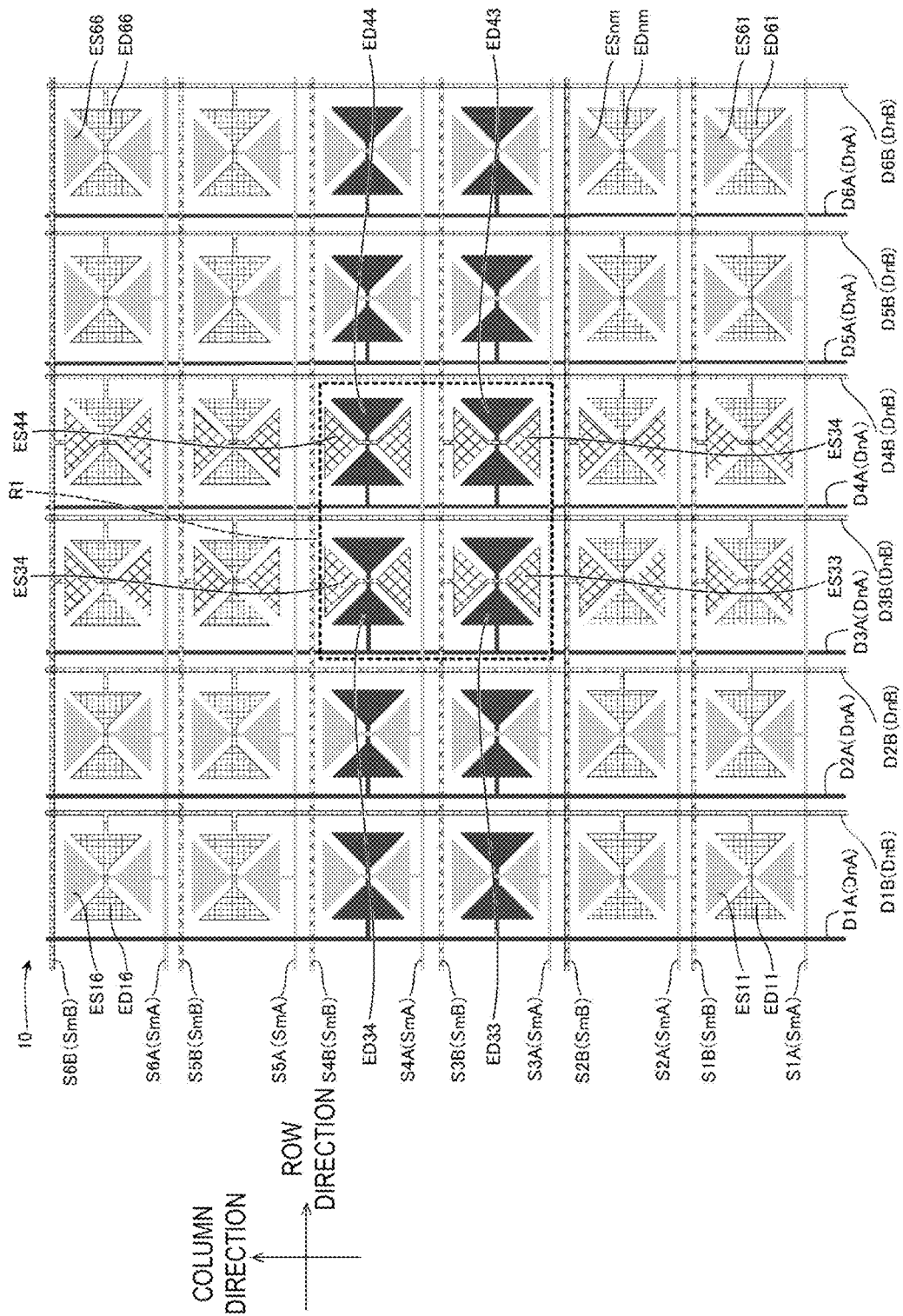
FIG. 10 is a diagram illustrating an example of a combination of integral drive electrodes and integral detection electrodes that are configured to detect a change in a short distance capacitance in the second connection state, according to the embodiment.

FIG. 10 is a diagram illustrating an example of a combination of integral drive electrodes and integral detection electrodes configured to detect a change in a short distance capacitance in the second connection state, according to the embodiment.

For example, as illustrated in FIG. 10, the controller unit 6 identifies a first region R1 that is a region for detecting a change in a short distance capacitance, based on the detection signals supplied from the detection wiring lines SmA and SmB. The first region R1 is a region including the first predetermined constant number of the drive electrodes EDnm that are integrally driven in the column direction with a distance near an input object being a non-conductor and being close to the touch sensor portion 10, and the second predetermined constant number of detection electrodes ESnm that are integrally driven in the row direction. For example, the first region R1 includes drive electrodes ED33, ED34, ED43, and ED44, and detection electrodes ES33, ES34, ES43, and ES44 that are sets with the drive electrodes ED33, ED34, ED43, and ED44, respectively. The detection electrodes ES33, ES34, ES43, and ES44 detect a change in a short distance capacitance with the drive electrodes ED33, ED34, ED43, and ED44, and supply the detected detection signals to the detection wiring lines S4A and S3A. Due to this, via the terminal TM2 connected to the detection wiring lines S4A and S3A in the switching unit 30 (FIG. 9), the detection signal is supplied to the controller unit 6. As a result, the controller unit 6 acquires the detection signal indicating the change in the short distance capacitance.

Figure 11:
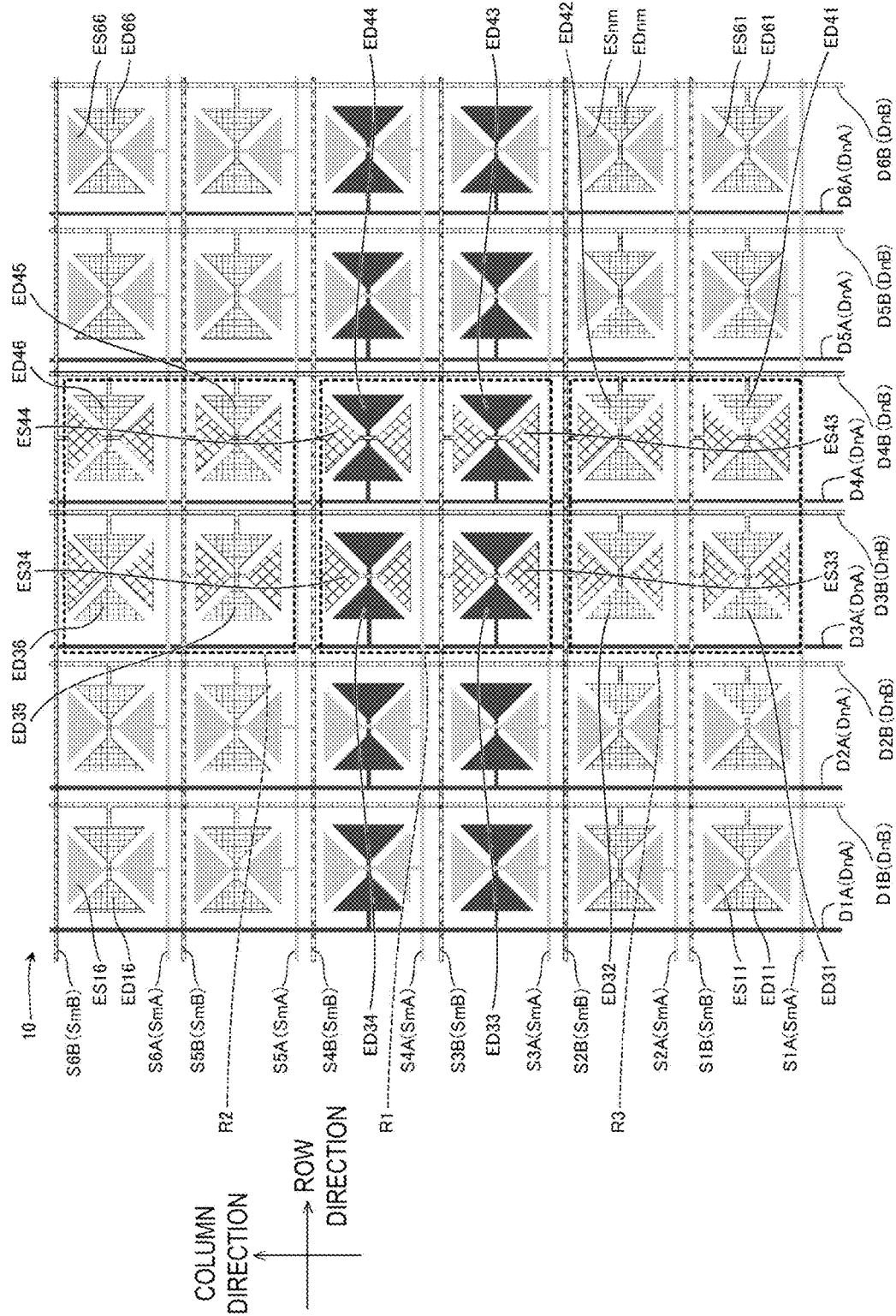
FIG. 11 is a diagram illustrating an example of a combination of integral drive electrodes and integral detection electrodes that are configured to detect a change in a first medium distance capacitance in the second connection state, according to the embodiment.

FIG. 11 is a diagram illustrating an example of a combination of integral drive electrodes and integral detection electrodes configured to detect a change in a first medium distance capacitance in the second connection state, according to the embodiment. For example, as illustrated in FIG. 11, the controller unit 6 identifies a second region R2 and a third region R3 that are regions for detecting the change in the first medium distance capacitance, based on detection signals supplied from the detection wiring lines SmA and SmB.

The second region R2 is a region that is adjacent to one side of the column direction of the first region R1 and that includes the first predetermined constant number of the drive electrodes EDnm that are integrally driven in each of the column direction and the row direction. For example, the second region R2 includes drive electrodes ED35, ED36, ED45, and ED46.

The third regions R3 is a region that is adjacent to the other side of the first region R1 in the column direction and that includes the first predetermined constant number of the drive electrodes EDnm that are integrally driven in each of the column direction and the row direction. For example, the third region R3 includes drive electrodes ED31, ED32, ED41, and ED42.

Then, the detection electrodes ES33, ES34, ES43, and ES44 included in the first region R1 detect, in addition to the change in the medium distance capacitance with the drive electrodes ED35, ED36, ED45, and ED46 included in the second region R2 adjacent to the one side of the column direction, the change in the medium distance capacitance with the drive electrodes ED31, ED32, ED41, and ED42 adjacent to the other side of the column direction, and supply the detected detection signals to the detection wiring lines S4A and S3A. Due to this, via the terminal TM2 connected to the detection wiring lines S4A and S3A in the switching unit 30 (FIG. 9), the detection signal is supplied to the controller unit 6. As a result, the controller unit 6 calculates and acquires the detection signal indicating the change in the first medium distance capacitance.

Figure 12:
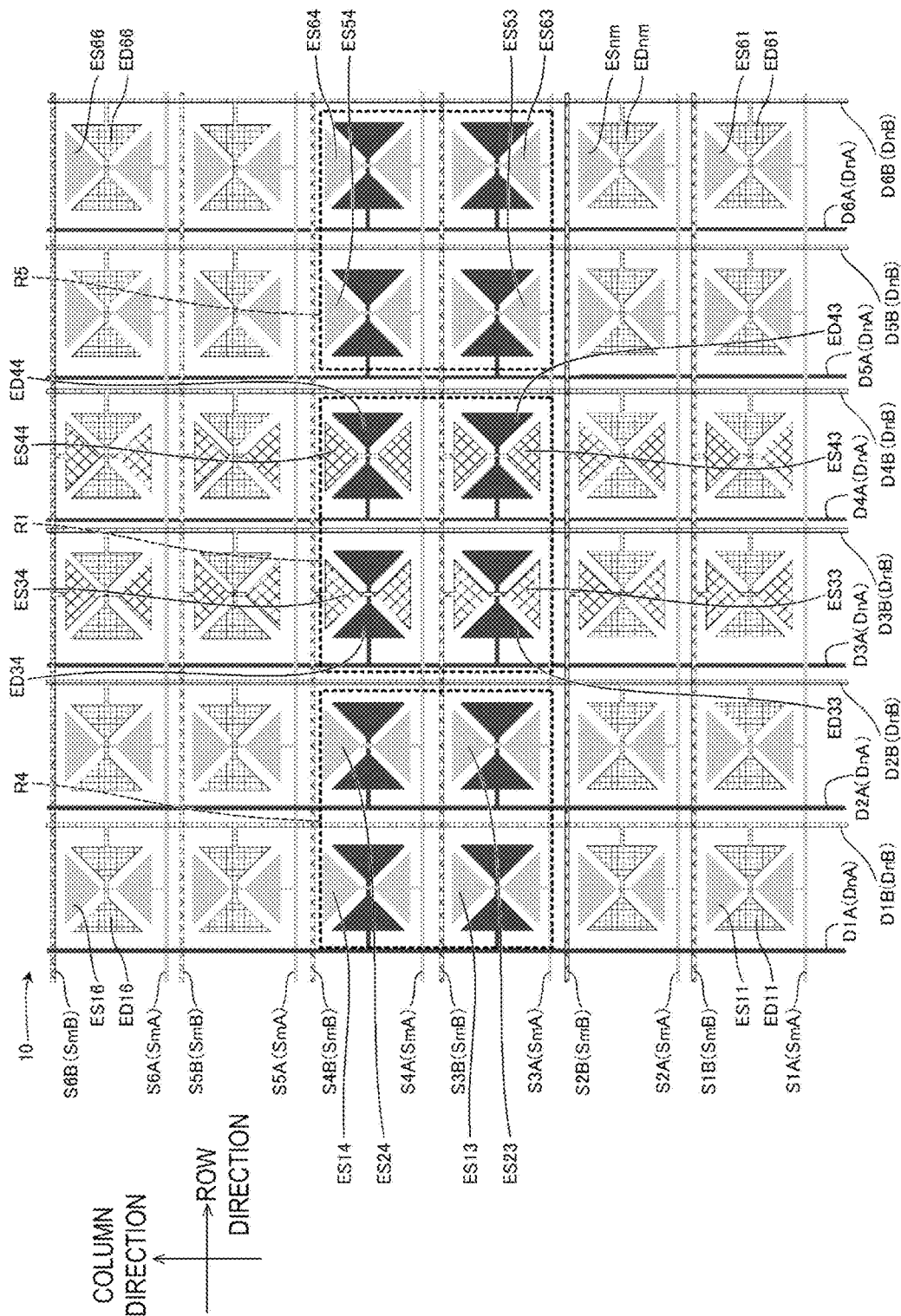
FIG. 12 is a diagram illustrating an example of a combination of integral drive electrodes and integral detection electrodes that are configured to detect a change in a second medium distance capacitance in the second connection state, according to the embodiment.

FIG. 12 is a diagram illustrating an example of a combination of integral drive electrodes and integral detection electrodes configured to detect a change in a second medium distance capacitance in the second connection state, according to the embodiment. For example, as illustrated in FIG. 12, the controller unit 6 identifies a fourth region R4 and a fifth region R5 that are regions for detecting a change in a second medium distance capacitance, based on the detection signals supplied from the detection wiring lines SmA and SmB.

The fourth region R4 is a region that is adjacent to one side of the first region R1 in the row direction and that includes the second predetermined constant number of the detection electrodes ESnm that are integrally driven in each of the column direction and the row direction. For example, the fourth region R4 includes detection electrodes ES13, ES14, ES23, and ES24.

The fifth region R5 is a region that is adjacent to the other side of the first region R1 in the row direction and that includes the second predetermined constant number of the detection electrodes ESnm that are integrally driven in each of the column direction and the row direction. For example, the fifth region R5 includes detection electrodes ES53, ED54, ED63, and ED64.

The detection electrodes ES13, ES14, ES23, and ES24 included in the fourth regions R4 detect a change in a medium distance capacitance with the drive electrodes ED33, ED34, ED43, and ED44 included in the first region R1. The detection electrodes ES53, ES54, ES63, and ES64 included in the fifth region R5 detect a change in a medium distance capacitance with the drive electrodes ED33, ED34, ED43, and ED44 included in the first region R1. The detection electrodes ES13, ES14, ES23, and ES24 included in the fourth region R4 and the detection electrodes ES53, ES54, ES63, and ES64 included in the fifth region R5 supply the detection signals where changes in medium distance capacitances with the drive electrodes ED33, ED34, ED43, and ED44 have been detected, to the detection wiring lines S3B and S4B. Due to this, via the terminal TM2 connected to the detection wiring lines S3B and S4B in the switching unit 30 (FIG. 9), the detection signal is supplied to the controller unit 6. As a result, the controller unit 6 calculates and acquires the detection signal indicating the change in the second medium distance capacitance.

Figure 13:
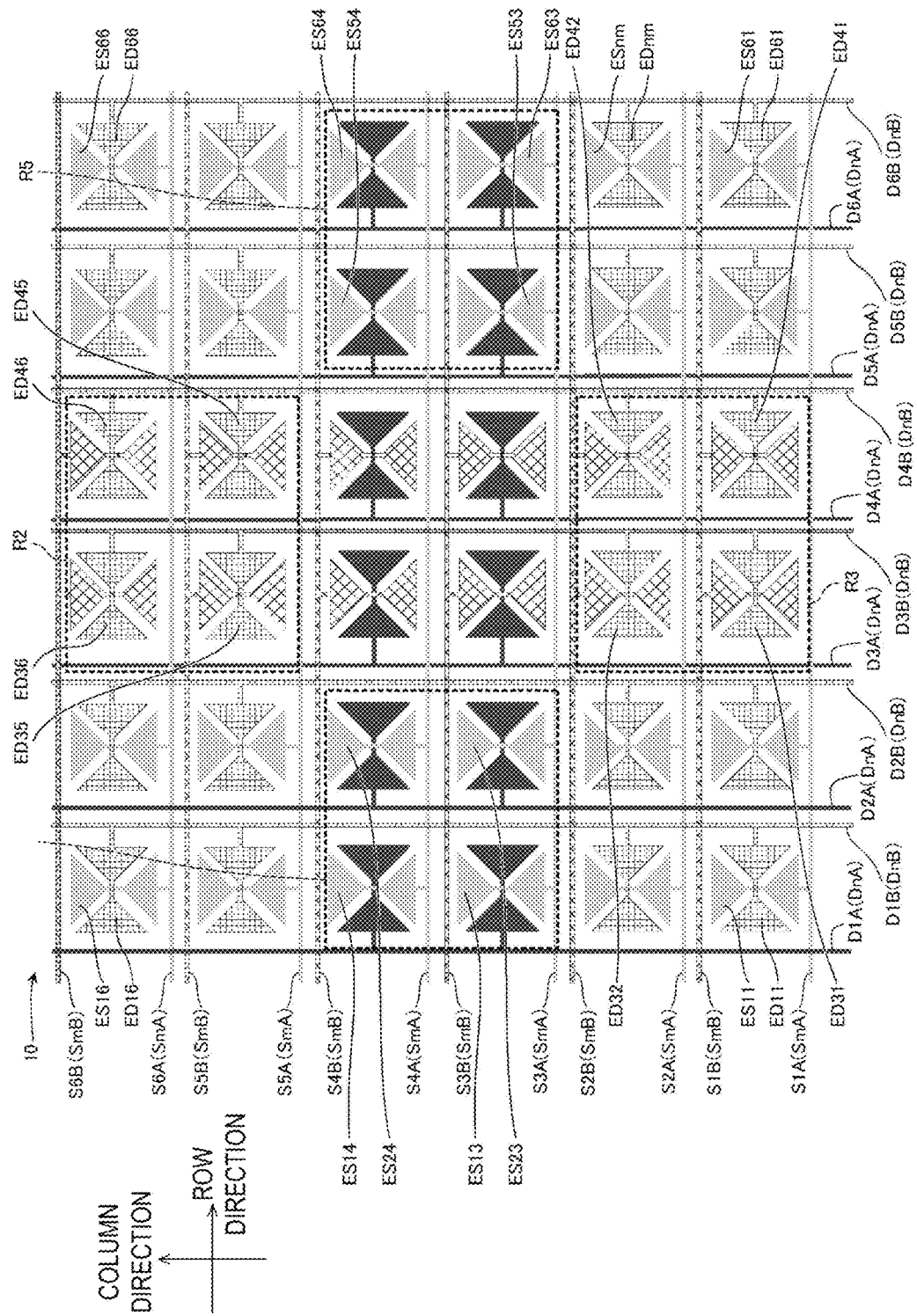
FIG. 13 is a diagram illustrating an example of a combination of integral drive electrodes and integral detection electrodes that are configured to detect a change in a long distance capacitance in the second connection state, according to the embodiment.

FIG. 13 is a diagram illustrating an example of a combination of integral drive electrodes and integral detection electrodes configured to detect a change in a long distance capacitance in the second connection state, according to the embodiment. For example, as illustrated in FIG. 13, the controller unit 6 identifies the second region R2 to the fifth region R5 each of which is a region for detecting a change in a long distance capacitance, based on detection signals supplied from the detection wiring lines SmA and SmB.

The second region R2 is adjacent to one side of the first region R1 in the column direction and includes the first predetermined constant number of the drive electrodes EDnm that are integrally driven in each of the column direction and the row direction. For example, the second region R2 includes drive electrodes ED35, ED36, ED45, and ED46.

The third region R3 is adjacent to the other side of the first region R1 in the column direction, and includes the first predetermined constant number of the drive electrodes EDnm that are integrally driven in each of the column direction and the row direction. For example, the third region R3 includes drive electrodes ED31, ED32, ED41, and ED42.

The fourth region R4 is adjacent to one side of the first region R1 in the row direction, and includes the second predetermined constant number of the detection electrodes ESnm that are integrally driven in each of the column direction and the row direction. For example, the fourth region R4 includes detection electrodes ES13, ES14, ES23, and ES24.

The fifth region R5 is adjacent to the other side of the first region R1 in the row direction, and includes the second predetermined constant number of the detection electrodes ESnm that are integrally driven in each of the column direction and the row direction. For example, the fifth region R5 includes detection electrodes ES53, ES54, ES63, and ES64.

Then, the detection electrodes ES13, ES14, ES23, and ES24 included in the fourth region R4 and the detection electrodes ES53, ES54, ES63, and ES64 included in the fifth region R5 detect changes in long distance capacitances with the drive electrodes ED35, ED36, ED45, and ED46 included in the second region R2 and the drive electrodes ED31, ED32, ED41, and ED42 included in the third region R3.

The detection electrodes ES13, ES14, ES23, and ES24 and the detection electrodes ES53, ES54, ES63, and ES64 supply detection signals each of which indicates the detected change in the long distance capacitance to the detection wiring lines S3B and S4B. Due to this, via the terminal TM2 connected to the detection wiring lines S3B and S4B in the switching unit 30 (FIG. 9), the detection signal is supplied to the controller unit 6. As a result, the controller unit 6 acquires the detection signal indicating the change in the long distance capacitance.

As described above, the controller unit 6 performs calculation based on the detection signal detected for each of the changes in the short distance capacitance, two types of the medium distance capacitances (the first medium distance capacitance and the second medium distance capacitance), and the long distance capacitance.

In other words, the controller unit 6 acquires a touch position of an input object that is a non-conductor approaching the first region R1 by performing calculation based on the detection signal obtained from each of the first region R1, the second region R2, the third region R3, the fourth region R4, and the fifth region R5.

As a result, the touch panel device 1 can accurately determine a conductor or a non-conductor to detect a touch position of an input object that is the non-conductor in addition to the conductor.

Note that the touch panel device 1 may calculate the touch position of the input object that is the non-conductor based on a detection signal that detects at least one of the changes in the short distance capacitance, the two types of the medium distance capacitances (the first medium distance capacitance and the second medium distance capacitance) and the long distance capacitance.

In this way, in the touch panel device 1, the switching unit 30 is configured to have the first connection state in which the drive wiring lines DnA adjacent to each other and the drive wiring lines DnB adjacent to the drive wiring lines DnA are connected among the plurality of drive wiring lines DnA and DnB, and the second connection state in which the drive wiring lines DnA adjacent to each other are connected to each other among the plurality of drive wiring lines DnA, and the drive wiring lines DnB adjacent to each other are connected to each other among the plurality of drive wiring lines DnB.

In this way, in the case of the first connection state, the plurality of drive electrodes connected to each of the drive wiring lines DnA and the drive wiring lines DnB adjacent to the drive wiring lines DnA can be integrally driven. Further, in the case of the second connection state, the plurality of drive electrodes EDnm connected to the respective drive wiring lines DnA adjacent to each other among the plurality of drive wiring lines DnA can be integrally driven, and the plurality of drive electrodes EDnm connected to the respective drive wiring lines DnB adjacent to each other among the plurality of drive wiring lines DnB can be integrally driven.

As a result, a combination of the drive electrodes EDnm that are integrally driven can be changed between the first connection state and the second connection state. Thus, depending on whether an input object of which a touch position is detected is a conductor or a non-conductor, it is possible to switch a combination of the drive electrodes EDnm that are optimized and integrally driven. As a result, even when the input object of which the touch position is detected is a conductor or a non-conductor, the touch position can be accurately detected.

In the touch panel device 1, when the switching unit 30 is in the first connection state, even in a case of, for example, a finger touch in which a user touches the touch sensor portion 10 with a finger, or even when the user touches the touch sensor portion 10 with a pen (for example, an active pen, a passive pen, or the like), the touch position can be accurately detected.

That is, in the first connection state, a pitch between the drive electrode EDnm and the detection electrode ESnm in the set that detect a change in a capacitance is finer than a pitch of each of the integrally driven drive electrodes and the integrally driven detection electrodes configured to detect a change in a capacitance in the second connection state. Thus, in the case of the first connection state, a touch position by using, for example, a finger or a conductor pen (active pen and passive pen) having a relatively narrow area that contacts the surface (touch surface) of the touch panel portion 2 can be detected with high accuracy.

In addition, by the switching unit 30 switching to the first connection state, in the first connection state, the arrangement of the pairs of the drive electrodes EDnm and the detection electrodes ESnm configured to detect a change in a capacitance can be made in the same arrangement as a regular diamond pattern. For this reason, in the case of the first connection state, a general-purpose algorithm for calculating position coordinates can be used in the controller unit 6.

In addition, in the touch panel device 1, when the switching unit 30 is in the second connection state, a distance between the integrally driven drive electrode and the integrally driven detection electrodes is relatively wide, so even when the input object is a non-conductor (for example, a thick glove), or a conductor such as a finger with a wider touch area than that of a pen tip, it is possible to detect the touch position.

Furthermore, the first connection state and the second connection state can be switched without changing the number of drive wiring lines DnA and DnB configured to supply the drive signals. In other words, the first connection state and the second connection state can be switched without changing the number of the terminals TM2 connected to the controller unit 6 by bundling the drive wiring lines DnA and DnB. As a result, even when the input object where the touch position is detected is a conductor or a non-conductor, it is possible to simplify the calculation processing of the controller unit 6 that generates the drive signal. In addition, according to the touch panel device 1, since the first connection state and the second connection state can be switched without increasing the number of terminals, a general-purpose touch panel controller having the normal number of terminals can be used without requiring a touch controller having a large number of terminals.

Note that, in the case of the second connection state, in addition to the fact that a pitch that is the distance between the drive electrodes integrally driven and the detection electrodes integrally driven is wider than that in the case of the first connection state, the arrangement of the drive electrodes integrally driven and the detection electrodes integrally driven is different from that in the regular diamond pattern. Thus, when a general-purpose touch panel controller configured to use an algorithm that calculates the position coordinates is used in the controller unit 6 in a case where the arrangement of the drive electrodes and the detection electrodes is a diamond pattern, detection of a touch position of a conductor pen (active pen and passive pen) having a relatively narrow touch area is more accurately performed in the first connection state than that in the second connection state.

In other words, for example, in the touch panel device 1, the touch position of the pen (active pen and passive pen) that is the conductor is detected in the first connection state after the switching unit 30 switches the connection state to the first connection state rather than the second connection state, and thus, the general-purpose touch panel controller configured to use the algorithm that calculates the position coordinates of the electrode arrangement in the diamond pattern can be used in the controller unit 6. In other words, the controller unit 6 having high versatility can be configured.

Furthermore, the first connection state and the second connection state can be switched without changing the number of detection wiring lines SmA and SmB to which the detection signals are supplied. In other words, the first connection state and the second connection state can be switched without changing the number of terminals TM2 connected to the controller unit 6 by bundling the detection wiring lines SmA and SmB. As a result, even when the input object of which the touch position is detected is a conductor or a non-conductor, the calculation processing of the controller unit 6 that acquires the detection signal to calculate the touch position can be simplified. In addition, since the first connection state and the second connection state can be switched without increasing the number of terminals, a general-purpose touch panel controller having the normal number of terminals can be used without requiring a touch controller having a large number of terminals.

Due to this, the controller unit 6 having high versatility can be configured, for example. As a result, manufacturing cost of the touch sensor device 1 can be reduced.

Figure 14:
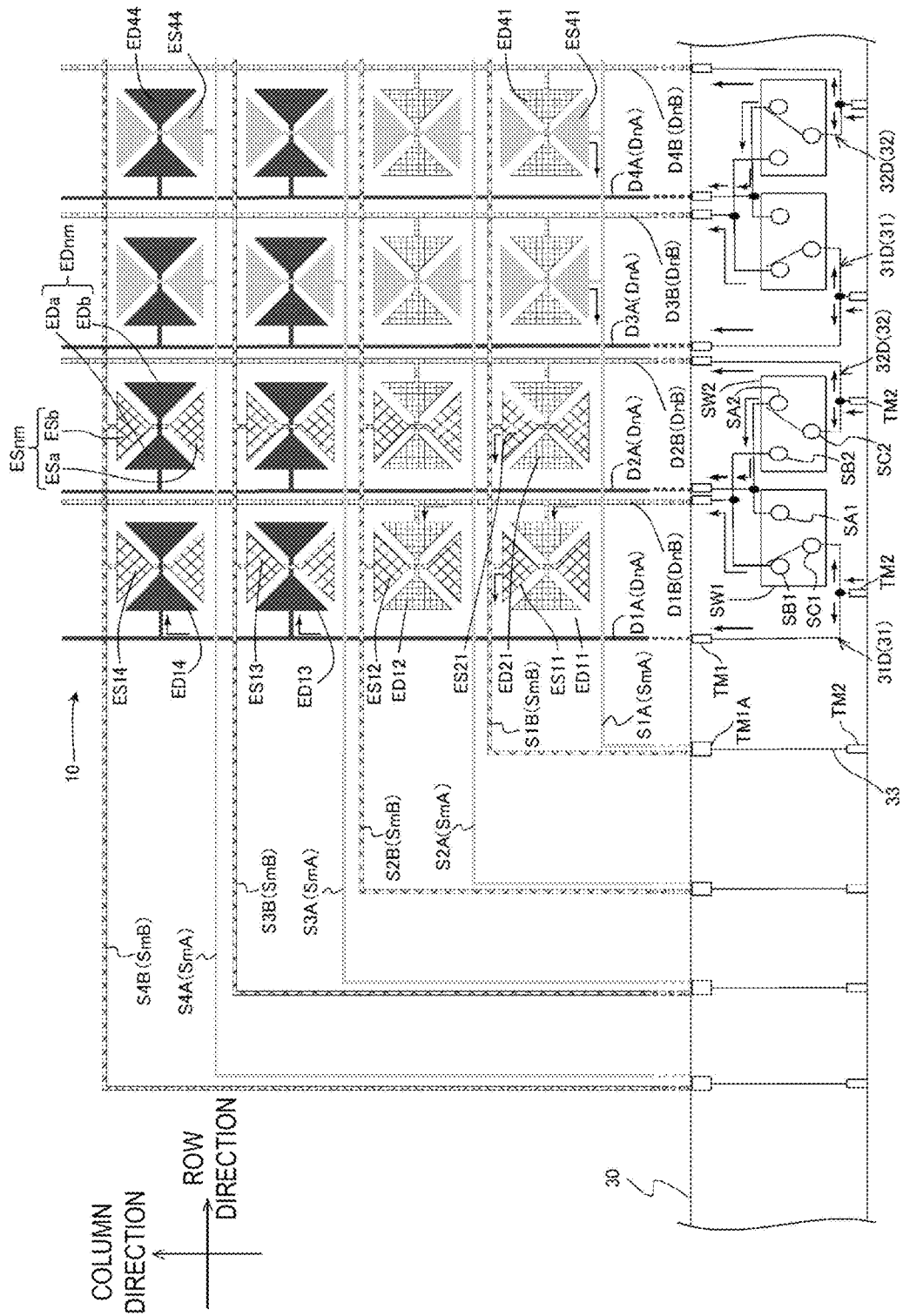
FIG. 14 is a plan view illustrating a schematic configuration of a touch sensor portion and a switching unit included in a touch panel device according to a first modified example of the embodiment.

FIG. 14 is a plan view illustrating a schematic configuration of the touch sensor portion 10 and the switching unit 30 of the touch panel device 1 according to a first modified example of the embodiment. As illustrated in FIG. 14, the detection wiring line SmA and the detection wiring line SmB adjacent to each other among the plurality of detection wiring lines SmA and SmB may be connected to each other. In the example illustrated in FIG. 14, the detection wiring line SmA and the detection wiring line SmB that are adjacent to each other are connected to the same terminal TM1A in the switching unit 30. Additionally, in the switching unit 30, each of a plurality of terminals TM1A is connected to the terminal TM2 by using a wiring line 33. In other words, in the example illustrated in FIG. 14, the wiring line 33 connecting the terminals TM1A and the terminal TM2 is not branched in the switching unit 30.

Thus, in the example illustrated in FIG. 14, the first connection state and the second connection state are switched between the plurality of terminals TM1 and the plurality of terminals TM2 connected to the drive wiring lines DnA and DnB, along with switching between the switch portions SW1 and SW2. On the other hand, the plurality of terminals TM1A connected to the detection wiring lines SmA and SmB physically connect the detection wiring lines SmA and SmB adjacent to each other, and do not switch the connection state. Due to this, the number of terminals TM1A can be reduced, compared with the number of terminals TM1. As a result, a frame region in the row direction of the touch sensor portion 10 can be narrowed, and the touch panel device 1 can be miniaturized.

Furthermore, since the switch portions SW1 and SW2 are not required between the terminals TM1A and the terminals TM2 connected to the detection wiring lines SmA and SmB, the circuit configuration of the switching unit 30 can be simplified and an occupied area by the circuit can be reduced.

Note that when the touch position of the input object that is the non-conductor is detected in the touch panel device 1 illustrated in FIG. 14, the controller unit 6 detects a change in a short distance capacitance by, for example, identifying the first region R1 (FIG. 10), and detects a change in a first medium distance capacitance by further identifying the second region R2 and the third region R3 (FIG. 11). As a result, the touch position of the input object that is the non-conductor can be accurately determined.

Figure 15:
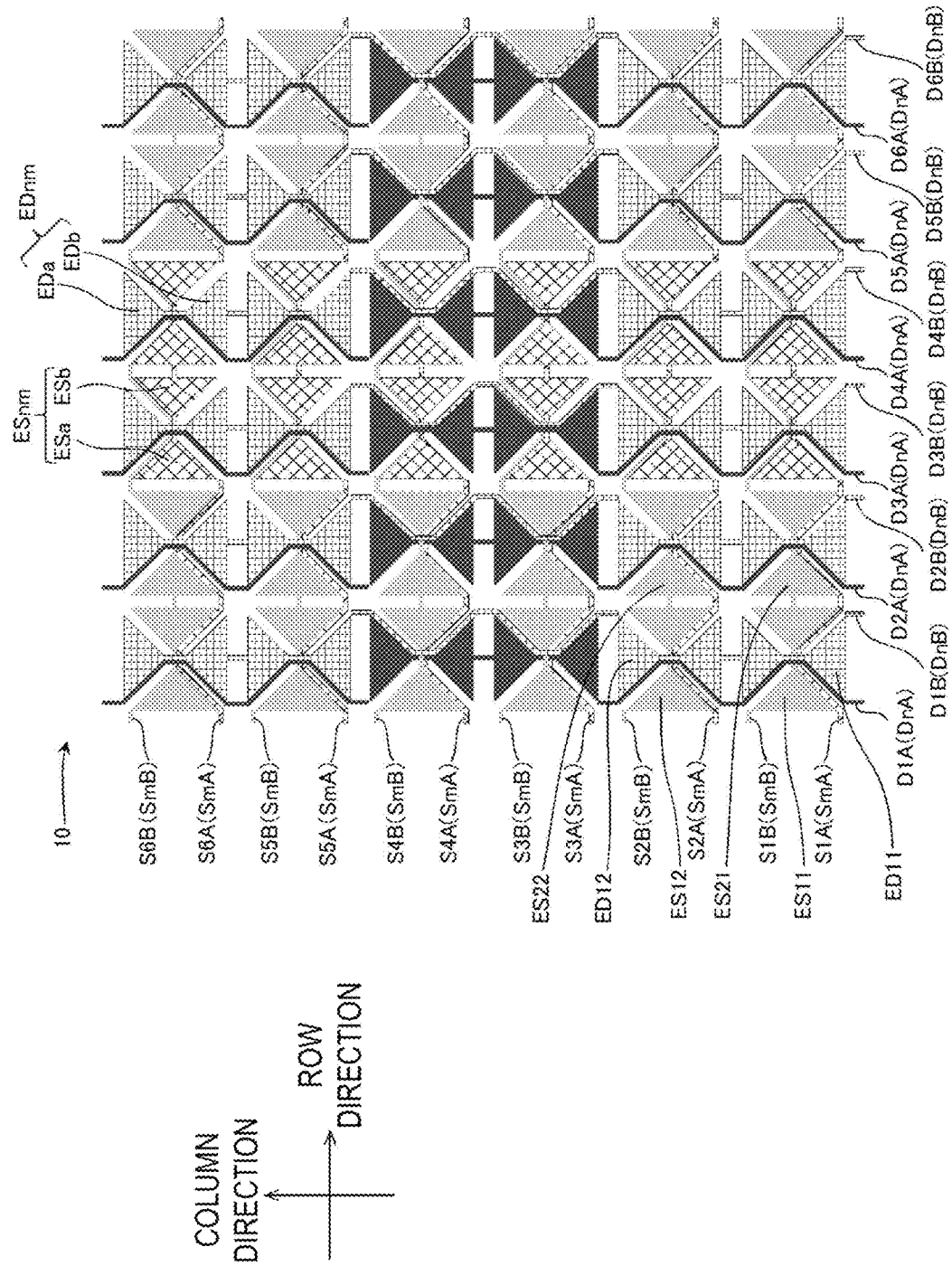
FIG. 15 is a plan view illustrating a schematic configuration of a touch sensor portion included in a touch panel device according to a second modified example of the embodiment.

FIG. 15 is a plan view illustrating a schematic configuration of the touch sensor portion 10 of the touch panel device 1 according to a second modified example of the embodiment. As illustrated in FIG. 15, each of the drive electrodes EDnm may have the first region EDa and the second region EDb arranged in the column direction, and the first region EDa and the second region EDb may be connected by a connection region. Additionally, each of the detection electrodes ESnm may have the first region ESa and the second region ESb arranged in the row direction, and the first region ESa and the second region ESb may be connected by a connection region.

In the example of FIG. 15, the plurality of drive electrodes EDnm are alternately connected to the drive wiring line DnA and the drive wiring line DnB adjacent to each other along the column direction for every first predetermined constant number (for example, every two) of drive electrodes EDnm. In each of the plurality of drive electrodes EDnm, the second region EDb and the first region EDa are alternately connected to the drive wiring line DnB or the drive wiring line DnA for every first predetermined constant number of the drive electrodes EDnm along the column direction.

For example, each of the plurality of drive electrodes EDnm is alternately connected to the drive wiring line DnB and the drive wiring line DnA for every two drive electrodes EDnm along the column direction.

Specifically, for example, the drive electrodes ED11 and ED12 are not connected to the drive wiring line D1A. The first region EDa of the drive electrode ED11 is connected to the drive wiring line D1B, and the second region EDb of the drive electrode ED11 is connected to the first region EDa of the drive electrode ED12 adjacent to one side of the drive electrode ED11 in the column direction by the drive wiring line D1B.

Further, for example, the drive electrodes ED13 and ED14 are not connected to the drive wiring line D1B. The first region EDa of the drive electrode ED13 is connected to the drive wiring line DnA, and the second region EDb of the drive electrode ED13 is connected to the first region EDa of the drive electrode ED14 adjacent to one side of the drive electrode ED13 in the column direction by the drive wiring line D1A.

The plurality of detection electrodes ESnm are alternately connected to the detection wiring line SmA and the detection wiring line SmB adjacent to each other along the row direction for every second predetermined constant number (for example, every two) of the detection electrodes ESnm. In each of the plurality of detection electrodes ESnm, the second region ESb and the first region ESa are alternately connected to the detection wiring line SmB or the detection wiring line SmA for every second predetermined constant number of the detection electrodes ESnm along the row direction.

For example, each of the plurality of detection electrodes ESnm is alternately connected to the detection wiring line SmB and the detection wiring line SmA, for every two detection electrodes ESnm along the row direction.

Specifically, for example, the detection electrodes ES11 and ES21 are not connected to the detection wiring line S1A. The first region ESa of the detection electrode ES11 is connected to the detection wiring line S1B, and the second region ESb of the detection electrode ES11 is connected to the first region ESa of the detection electrode ES12 adjacent to one side of the detection electrode ES11 in the row direction by the detection wiring line S1B.

Further, for example, the detection electrodes ES31 and ED41 are not connected to the detection wiring line S1B. The first region ESa of the detection electrode ES31 is connected to the detection wiring line S1A, and the second region ESb of the detection electrode ES31 is connected to the first region ESa of the detection electrode ES41 adjacent to one side of the detection electrode ES31 in the row direction by the detection wiring line S1A.

In this way, a direction in which each of the drive electrodes EDnm is aligned, and a direction in which the first region EDa and the second region EDb in each of the drive electrodes EDnm are aligned are the same direction, that is, the column direction.

In addition, a direction in which each of the detection electrodes ESnm is aligned and a direction in which the first region ESa and the second region ESb in each of the detection electrodes ESnm are aligned are the same direction, namely, the row direction. Due to this, the controller unit 6 can simplify the calculation of the coordinate positions. Due to this, manufacturing cost of the controller unit 6 can be reduced. In addition, as a result, since the arrangement pattern of the drive electrodes EDnm and the detection electrodes ESnm is a common diamond pattern, and a general-purpose position coordinate calculation algorithm prepared for the diamond pattern can be used, a dedicated controller is unnecessary, a general-purpose touch panel controller can be used, and the cost can be reduced.

Figure 16:
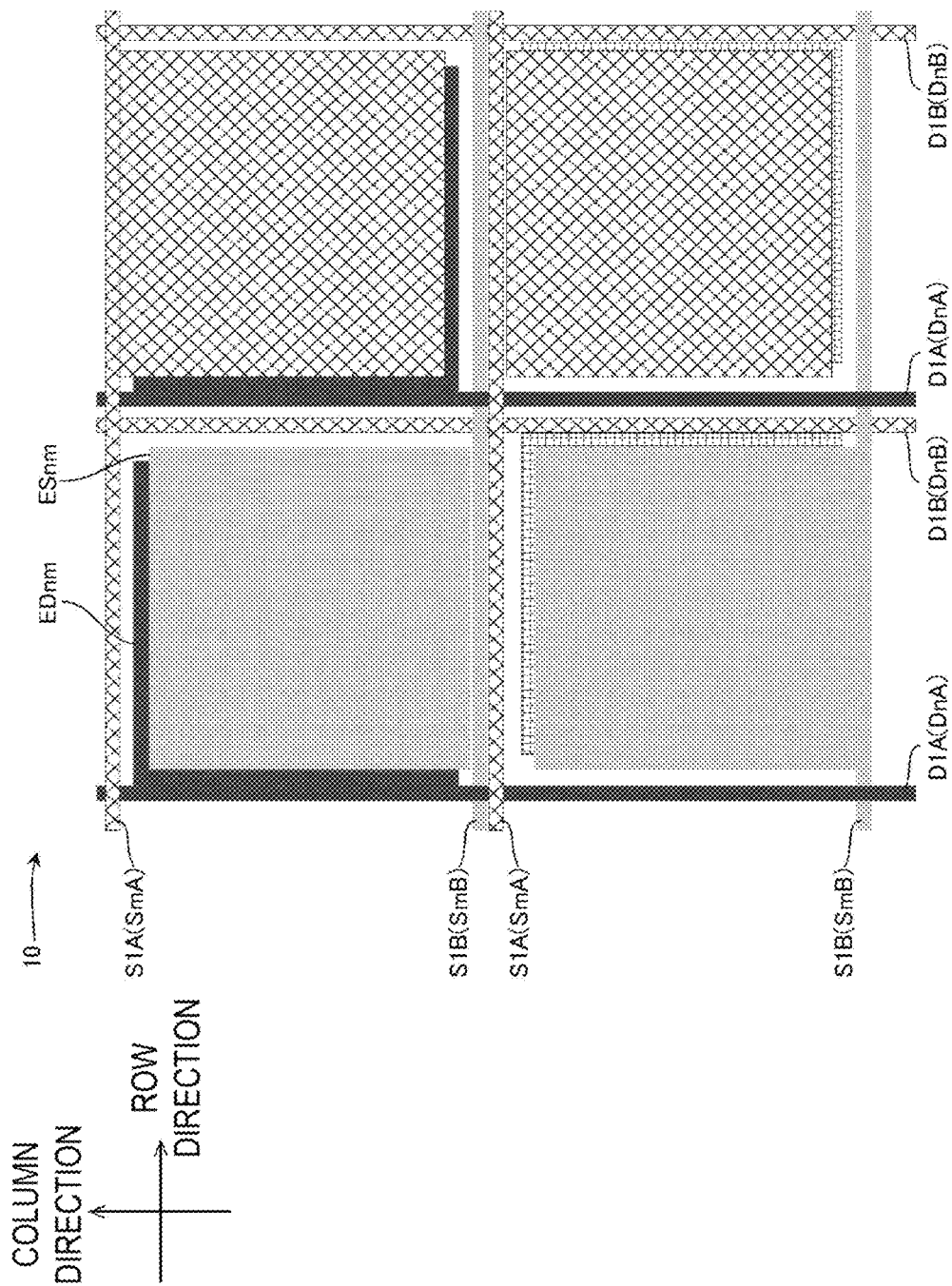
FIG. 16 is a plan view illustrating a schematic configuration of a touch sensor portion included in a touch panel device according to a third modified example of the embodiment.

FIG. 16 is a plan view illustrating a schematic configuration of the touch sensor portion 10 of the touch panel device 1 according to a third modified example of the embodiment. As illustrated in FIG. 16, each of the drive electrode EDnm and the detection electrode ESnm may be rectangular, and the drive electrode EDnm and the detection electrode ESnm may overlap with each other. Each of the drive electrode EDnm and the detection electrode ESnm has a mesh structure in which the mesh is fine. In the example illustrated in FIG. 16, the drive electrode EDnm and the detection electrode ESnm largely overlap with each other, and, for example, halves or more of the respective areas overlap with each other. According to the touch sensor portion 10 illustrated in FIG. 16, since each of the drive electrode EDnm and the detection electrode ESnm is rectangular, signal distribution of the drive signal supplied to the drive electrode EDnm and the detection signal supplied from the detection electrode ESnm is at a constant position, and an inclination of a touch pen can be detected.

The present disclosure is not limited to the embodiment described above, and may be substituted with a configuration that is substantially the same as the configuration described in the embodiment described above, a configuration that achieves the same action and effect, or a configuration capable of achieving the same object.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel device comprising:
a plurality of drive wiring lines extending in a column direction, each of the plurality of drive wiring lines configured to cause a drive signal to flow;
a plurality of detection wiring lines extending in a row direction intersecting the plurality of drive wiring lines, each of the plurality of detection wiring lines configured to cause a detection signal to flow, the detection signal indicating a change in a capacitance formed based on the corresponding drive wiring line among the plurality of drive wiring lines;
a plurality of drive electrodes individually connected to the corresponding drive wiring line among the plurality of drive wiring lines;
a plurality of detection electrodes individually connected to the corresponding detection wiring line among the plurality of detection wiring lines; and
a switching unit configured to switch a connection state of each two of the plurality of drive wiring lines, wherein
the plurality of drive wiring lines include a plurality of first drive wiring lines and a plurality of second drive wiring lines alternately arranged,
the plurality of drive electrodes are alternately connected to the plurality of first drive wiring lines and the plurality of second drive wiring lines adjacent to each other for every first predetermined constant number of the drive electrodes along a column direction, and
the switching unit is configured to switch between
a first connection state in which the first drive wiring line and the second drive wiring line that are adjacent to each other among the plurality of drive wiring lines are connected, and
a second connection state in which the first drive wiring lines adjacent to each other are connected to each other and the second drive wiring lines adjacent to each other are connected to each other.

2. The touch panel device according to claim 1, wherein the plurality of detection wiring lines includes a plurality of first detection wiring lines and a plurality of second detection wiring lines alternately arranged,
the plurality of detection electrodes are alternately connected to the plurality of first detection wiring lines and the plurality of second detection wiring lines adjacent to each other for every second predetermined constant number of the detection electrodes along the row direction, and the switching unit is configured to,
in the first connection state, connect the first detection wiring line and the second detection wiring line that are adjacent to each other among the plurality of drive wiring lines, and,
in the second connection state, connect the first detection wiring lines adjacent to each other to each other, and connect the second detection wiring lines adjacent to each other to each other.

3. The touch panel device according to claim 1, further comprising:
a position calculation unit configured to calculate a coordinate position of a target object proximate to the plurality of drive electrodes and the plurality of detection electrodes based on the detection signal output from each of the plurality of detection wiring lines.

4. The touch panel device according to claim 3, wherein the position calculation unit is
configured to identify, based on the detection signal, a first region being close to the target object, the first region including a first predetermined constant number of the drive electrodes in the column direction and a second predetermined constant number of the detection electrodes in the row direction, and
configured to calculate a coordinate position of the target object based on the detection signal obtained by using the first region.

5. The touch panel device according to claim 3, wherein the position calculation unit is configured, based on the detection signal, to identify a first region being close to the target object, the first region including a second predetermined constant number of the detection electrodes in the row direction, and to identify a second region being adjacent to one side of the column direction with respect to the first region, the second region including the first predetermined constant number of the drive electrodes in the column direction, and to identify a third region being adjacent to another side of the column direction with respect to the first region, the third region including a first predetermined constant number of the drive electrodes in the column direction, and to calculate a coordinate position of the target object based on the detection signal obtained by using the first region, the second region, and the third region.

6. The touch panel device according to claim 3, wherein the position calculation unit is configured, based on the detection signal, to identify a first region being close to the target object, the first region including the first predetermined constant number of the drive electrodes in the column direction, and to identify a fourth region being adjacent to one side of the first region in the row direction with respect to the first region, the fourth region including the second predetermined constant number of the detection electrodes in the row direction, and to identify a fifth region being adjacent to another side of the row direction with respect to the first region, the fifth region including the second predetermined constant number of the detection electrodes in the row direction, and to calculate a coordinate position of the target object based on the detection signal obtained by using the first region, the fourth region, and the fifth region.

7. The touch panel device according to claim 3, wherein the position calculation unit is configured, based on the detection signal, to identify a second region being adjacent to one side of the column direction with respect to a first region being close to the target object, the first region including the second predetermined constant number of the detection electrodes in the row direction, the second region including the first predetermined constant number of the drive electrodes in the column direction, to identify a third region being adjacent to another side of the column direction with respect to the first region, the third region including the first predetermined constant number of the drive electrodes in the column direction, to identify a fourth region being adjacent to one side of the first region in the row direction, the fourth region including the second predetermined constant number of the detection electrodes in the row direction, to identify a fifth region being adjacent to another side of the row direction with respect to the first region, the fifth region including the second predetermined constant number of the detection electrodes in the row direction, and to calculate a position of the target object based on the detection signal obtained by using the second region, the third region, the fourth region, and the fifth region.

8. The touch panel device according to claim 2, wherein the first detection wiring line and the second detection wiring line that are adjacent to each other among the plurality of detection wiring lines are connected.

9. The touch panel device according to claim 1, wherein each of the plurality of drive electrodes includes a first region and a second region aligned in the column direction and connected to each other.

10. The touch panel device according to claim 1, wherein each of the plurality of drive electrodes and each of the plurality of detection electrodes are rectangular and overlap with each other.

11. The touch panel device according to claim 2, wherein the first predetermined constant number is two, and the second predetermined constant number is two.

* * * * *